(12) United States Patent
Leung

(10) Patent No.: US 8,413,110 B2
(45) Date of Patent: Apr. 2, 2013

(54) AUTOMATING APPLICATIONS IN A MULTIMEDIA FRAMEWORK

(76) Inventor: Kai C. Leung, Dedham, MA (US)

( * ) Notice: Subject to any disclaimer, the term of this patent is extended or adjusted under 35 U.S.C. 154(b) by 1053 days.

(21) Appl. No.: 12/150,129

(22) Filed: Apr. 25, 2008

(65) Prior Publication Data

US 2008/0270978 A1 Oct. 30, 2008

Related U.S. Application Data

(60) Provisional application No. 60/925,933, filed on Apr. 25, 2007.

(51) Int. Cl.
*G06F 9/44* (2006.01)
*G06F 17/30* (2006.01)

(52) U.S. Cl. .................................. 717/106; 707/102

(58) Field of Classification Search .................. 717/106
See application file for complete search history.

(56) References Cited

U.S. PATENT DOCUMENTS

| | | | | |
|---|---|---|---|---|
| 5,911,070 A * | 6/1999 | Solton et al. | | 717/105 |
| 6,332,163 B1 * | 12/2001 | Bowman-Amuah | | 709/231 |
| 6,430,549 B1 | 8/2002 | Gershfield et al. | | |
| 6,613,099 B2 * | 9/2003 | Crim | | 715/210 |
| 6,988,138 B1 * | 1/2006 | Alcorn et al. | | 709/225 |
| 7,024,425 B2 | 4/2006 | Krishnaprasad et al. | | |
| 7,080,030 B2 * | 7/2006 | Eglen et al. | | 705/26.41 |
| 7,092,967 B1 | 8/2006 | Pannala et al. | | |
| 7,437,458 B1 * | 10/2008 | Stewart et al. | | 709/226 |
| 7,593,980 B2 * | 9/2009 | Marascio et al. | | 709/201 |
| 7,599,942 B1 * | 10/2009 | Mohamad | | 1/1 |
| 7,734,684 B2 * | 6/2010 | Zeng et al. | | 709/203 |
| 2002/0184401 A1 | 12/2002 | Kadel, Jr. et al. | | |
| 2002/0184610 A1 | 12/2002 | Chong et al. | | |
| 2003/0140121 A1 * | 7/2003 | Adams | | 709/219 |
| 2004/0017395 A1 * | 1/2004 | Cook | | 345/745 |
| 2004/0039990 A1 * | 2/2004 | Bakar et al. | | 715/505 |
| 2004/0153508 A1 * | 8/2004 | Alcorn et al. | | 709/205 |
| 2004/0205695 A1 * | 10/2004 | Fletcher | | 717/105 |
| 2004/0243931 A1 * | 12/2004 | Stevens et al. | | 715/513 |
| 2005/0149458 A1 * | 7/2005 | Eglen et al. | | 705/400 |
| 2005/0257204 A1 * | 11/2005 | Bryant et al. | | 717/163 |
| 2005/0257240 A1 * | 11/2005 | Faulkner et al. | | 725/92 |
| 2005/0289145 A1 * | 12/2005 | Voegel | | 707/9 |
| 2006/0041679 A1 * | 2/2006 | Feig | | 709/236 |
| 2006/0173865 A1 * | 8/2006 | Fong | | 707/100 |
| 2006/0248015 A1 * | 11/2006 | Baartman et al. | | 705/52 |
| 2007/0083543 A1 * | 4/2007 | Chen | | 707/102 |
| 2007/0192337 A1 * | 8/2007 | Chandrasekar Iyer et al. | | 707/100 |
| 2007/0204311 A1 * | 8/2007 | Hasek et al. | | 725/91 |
| 2007/0234271 A1 * | 10/2007 | Winkler et al. | | 717/100 |
| 2007/0234345 A1 * | 10/2007 | Kramer et al. | | 717/174 |
| 2007/0276767 A1 * | 11/2007 | Kim et al. | | 705/77 |
| 2008/0015962 A1 * | 1/2008 | Smith | | 705/35 |
| 2008/0016111 A1 * | 1/2008 | Keen | | 707/104.1 |
| 2008/0189752 A1 * | 8/2008 | Moradi et al. | | 725/105 |

* cited by examiner

*Primary Examiner* — Don Wong
*Assistant Examiner* — Theodore Hebert
(74) *Attorney, Agent, or Firm* — Daniel N. Smith

(57) ABSTRACT

The present invention provides a multimedia software framework system that allows development of customized multimedia plug-in applications for use within the system. Users can customize fields in the data entry, database, query and report forms without any programming effort. The information is packaged in an Application plug-in module which can be transported to any personal computer or network server. The information can be integrated into a core multimedia framework with features for video capturing, image processing, video and image broadcasting, entity work space elaboration, and instant multimedia messaging. The present invention also provides Internet Service Providers with a new opportunity for hosting application servers because the system resources in the core multimedia framework server can be partitioned for different applications and user accounts without any additional programming effort.

15 Claims, 43 Drawing Sheets

Job Handling Sequence Between Application Server and Client Computer(s)

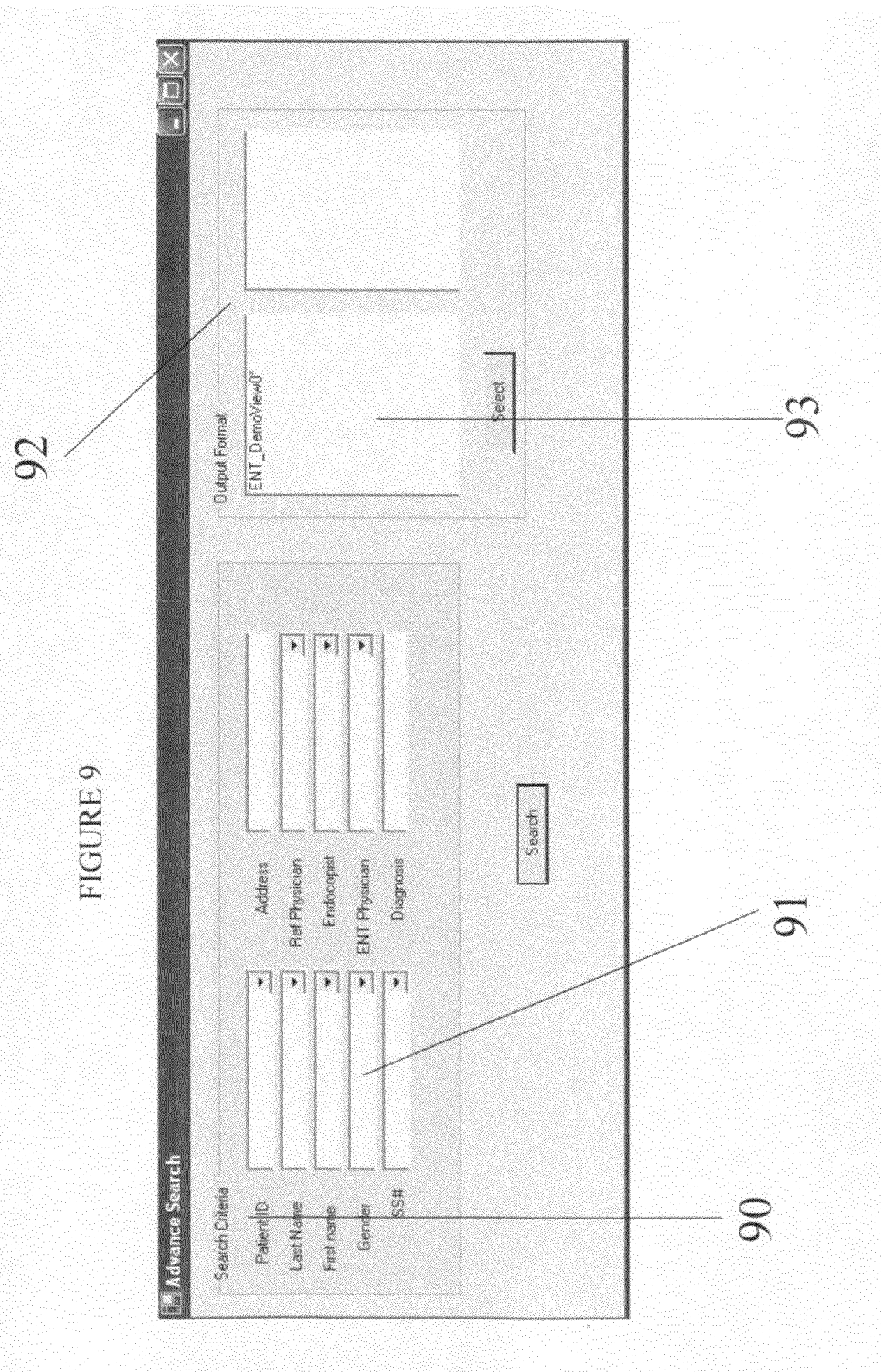

FIGURE 9a

| Patient ID | Last Name | First name | Gender | SS# | Date of Birth | Address |
|---|---|---|---|---|---|---|
| 12345 | Lee | Jimmy | Female | 011-22-3212 | 1/23/80 | |
| 32123 | Wong | Mary | Female | | 3/4/90 | |
| 23123 | Young | Dick | Male | | 1/2/78 | |

☐ Landscape   Print Preview   Print   Refresh   Close

Replacement Sheet

Figure 18

*Center for Voice and Swallowing Disorders – Examination Report*
*Department of Otolaryngology – Head and Neck Surgery*

Boston
Medical Center
Patient Information

Name:             Mary, Jane
Gender:           FEMALE
Patient ID:       KK2345
ENT Physician:
Referring Physician:
Endoscopist:
Original Complaints:
Patient History Comments:

Gross Exam

| | | | |
|---|---|---|---|
| Exam Original Date | 1/19/2006 2:42:42 AM | Last Modified On | 1/19/2006 2:42:42 AM |
| Pharynx | Edematous | Velopharyngeal port function | Mildly reduced |
| Supraglottal region | Normal | Nasal cavities | Deviated Septum |
| Abnormalities | Scaming | Vallecula | Asymmetry |
| Vestibular fold structure | Lesion(s) | Anterior and posterior commissures | Salivary Secretions |
| Vocal fold mobility | Scaming | Aryepiglottic fold structure | Lesion(s) |
| Pyriform sinuses | Normal Appearance and Mobility | | |
| Hyperfunction on phonation | Severe | | |

Stroboscopy Exam

| | | | |
|---|---|---|---|
| Vocal Fold Edge Left | Rough and Irregular | Vocal Fold Edge Right | Rough and Irregular |
| Vestibular fold compression | Slight Compression | Vestibular fold symmetry | L>R |
| Arytenoids complex symmetry | L>R | Arytenoids complex movement | Fair |
| Mucosal wave periodicity | Slightly Decreased | Mucosal wave phase symmetry | Complete Adsense Sometimes |
| Type of glottic closure | Posterior | | |

Exam Notes

Diagnosis

| Name | Type | Char Width | Key | Display Name | Discrete Search | Drop down option |
|---|---|---|---|---|---|---|
| SpareField1 | variable char | 120 | N | SpareField1 | N | |
| SpareField2 | variable char | 120 | N | SpareField2 | N | |
| SpareField3 | variable char | 120 | N | SpareField3 | N | |
| SpareField4 | variable char | 120 | N | SpareField4 | N | |
| SpareField5 | variable char | 120 | N | SpareField5 | N | |
| SpareField6 | variable char | 120 | N | SpareField6 | N | |
| SpareField7 | variable char | 120 | N | SpareField7 | N | |
| SpareField8 | variable char | 120 | N | SpareField8 | N | |
| SpareField9 | variable char | 120 | N | SpareField9 | N | |
| SpareField10 | date time | 8 | N | SpareField10 | N | |
| SpareField11 | date time | 8 | N | SpareField11 | N | |
| SpareField12 | integer | 8 | N | SpareField12 | N | |
| SpareField13 | integer | 8 | N | SpareField13 | N | |
| SpareField14 | integer | 8 | N | SpareField14 | N | |
| EntityID | variable char | 60 | Y | Event ID | N | |
| Trip | variable char | 120 | N | Vacation | Y | Boston,San Francisco,Chicago,Hong Kong,New York |
| Occasion | variable char | 120 | N | Parties | Y | Wedding,Birthday Party,Beach Party |
| WorkShop | variable char | 120 | N | Work Shop | N | Cooking,Automobile,Kung Fu,Interior Design |
| Sports | variable char | 80 | N | Sports | Y | Baseball,Football,Soccer,Basketball |
| Hobby | variable char | 120 | N | Hobby | Y | Fishing,Astronomy,Wind Surfing,Bird Watching |
| Name | variable char | 60 | N | Name | N | |
| Telephone | variable char | 60 | N | Telephone | N | |
| CellPhone | variable char | 60 | N | Cell Phone | Y | |
| Address | variable char | 200 | N | Address | N | |
| Email | variable char | 200 | N | Email | Y | |
| Relationship | variable char | 100 | N | Relationship | N | |

290 Data Base Design
291 Column Definition
292 Add / Insert
293 Delete
294 Modify / Save / Close FIGURE 31b FIGURE 32b

FIGURE 34

```
<FieldInfo>
    <szColName />
    <szDisplayName />
    <szType>Group</szType>
    <iEditWidth>20</iEditWidth>
    <szDropDownType />
    <iStartX>0</iStartX>
    <iStartY>0</iStartY>
    <iDeltaX>592</iDeltaX>
    <iDeltaY>296</iDeltaY>
    <iStringLength>0</iStringLength>
    <bDisabled>false</bDisabled>
    <szGroupName>Basic Information</szGroupName>
    <iEditHeight>20</iEditHeight>
    <bEditMultiLine>false</bEditMultiLine>
    <iDBType>0</iDBType>
    <bMustFill>false</bMustFill>
    <bKey>false</bKey>
    <szDataType>variable char</szDataType>
    <szData />
    <bTimeStamp>false</bTimeStamp>
    <bDiscreteSearch>false</bDiscreteSearch>
    <iColWidth>20</iColWidth>
</FieldInfo>
```

AUTOMATING APPLICATIONS IN A MULTIMEDIA FRAMEWORK

CROSS REFERENCE TO RELATED APPLICATION

This application claims the benefit of U.S. Provisional Application No. 60/925,933 filed on Apr. 25, 2007, the contents of which are incorporated herein by reference.

FIELD OF THE INVENTION

The present invention relates generally to software systems, and more specifically to multimedia based software systems. In particular this system relates to multimedia framework software which captures, organizes, saves, and broadcasts multimedia data globally within a systematic handbook design approach. No additional software programming effort is required for adding a new application to the framework.

BACKGROUND OF INVENTION

Software applications have been developed that manage and organize multimedia contents such as text, images and videos.

Presently, there are no software systems that allow for the easy development of user customized multimedia plug-in applications, wherein users are allowed to automate an application using standard multimedia features with different customized data entry and database requirements. For example, if a user wishes to use a multimedia application for use in performing an endoscopic examinations, the user may begin to write a program from scratch to specify the multimedia features such as video capturing, image processing, third party file integration, database and data query. Any such effort is very expensive and time consuming.

The present invention provides a solution to these shortcomings by introducing a multimedia software framework system that allows users to develop their own customized multimedia plug-in application for use within said multimedia framework software system. With an authorizing tool, users can customize fields in the data entry forms, database forms, query forms and report forms without any programming effort. The information is packaged in an Application plug-in module which can be transported to any personal computer or network server. The information can be integrated into a core multimedia framework with features for video capturing, image processing, video and image broadcasting, entity work space elaboration, and instant multimedia messaging.

The present invention allows a user to create a new framework-based multimedia application in a matter of hours and instantly share its information among global users.

The present invention also provides Internet Service Providers with a new opportunity for hosting application servers because the system resources in the core multimedia framework server can be partitioned for different applications and user accounts without any additional programming effort.

SUMMARY OF THE INVENTION

It is an object of the present invention to overcome the previously mentioned shortcomings found in the prior art to allow a user with no programming experience to create an instant multimedia application.

Another object of the present invention is to create an Internet/Intranet based application server which can be mounted in any computer cluster and instantly provide multimedia services after the application's related database is installed from a set of XML files.

Another object of the present invention is to produce an easily extensible multimedia software system that does not require additional software coding to add new applications to the software framework.

Another object of the present invention is to run the multimedia framework features with the customized application on a single computer without any network connection.

Another object of the present invention is to consolidate data entry of an application into two forms data entry namely the demographic and session.

Another object of the present invention is to design the demographic and session form layout with layout tools and to save the form properties in XML files.

Another object of the present invention is to design the data query form layout with layout tools and to save the form properties in XML files.

Another object of the present invention is to design the report layout with layout tools and to save the layout properties in XML files.

Another object of the present invention is to design the searched result layout with layout tools and to save the layout properties in XML files.

Another object of the present invention is to design the database tables supporting the demographic and session forms with layout tools and to save the table properties in XML files.

Another object of the present invention is to package all the XML files related to an application into an Application Plug In Module (APIM) and to migrate that to any PC based computer to host the application.

Another object of the present invention is to dynamically create the data entry, data query, searched result and report forms from the form properties in the XML files.

Another object of the present invention is to dynamically create the demographic and session tables in the database from the properties in the XML files.

Another object of the present invention is to add and modify data fields in the demographic and session forms freely with association to the supportive database fields without any reprogramming effort.

Another object of the present invention is to add and delete database fields in the demographic and session tables freely without any reprogramming effort.

Another object of the present invention is to integrate the static core multimedia framework tables with the dynamically generated, business oriented, XML based tables in the same database.

Another object of the present invention is to create a work space to fully elaborate an entity with standard multimedia features and customizable demographic and session data entries.

Another object of the present invention is to produce an automatic streamlined workflow to manage image and video files from the point they are captured from a camera to the point they are shared and viewed by global audiences.

Another object of the present invention is to capture video and images from a camera connected on an USB port and directly deposit them into the current entity's profile.

Another object of the present invention is to use voice commands to control the capturing of images and videos from a camera connected on an USB port.

Another object of the present invention is to instantly broadcast captured video files to other Internet/Intranet connected work stations for display via the Application Server.

Another object of the present invention is to use voice commands to automate workflows from the point of entity account creation, to work space creation, to session creation, to video capturing from a camera, to save in database, to broadcasting to the Internet all without keyboard intervention.

Another object of the present invention is to produce n points to n points instant captured video file broadcasting. Each broadcasting channel is assigned to an entity selectable by the end user.

Another object of the present invention is to produce an instant multimedia messaging board in each entity's work space allowing remote users to communicate on the same subject with text and videos.

Another object of the present invention is to create a video replay interface that can replay video frames one at a time, capture the sharpest image and integrate that into the entity's work space.

Another object of the present invention is to produce an easily extensible multimedia software system that automatically files every multimedia recording in the work space of an entity Another object of the present invention is to produce a database that can quickly locate multimedia information related to an entity and present them in a map of thumbnails Another object of the present invention is to save huge multimedia video files in an indexed database system that can quickly locate them in the storage area and retrieve them for downloading to the client for display.

Another object of the present invention is to produce an easily extensible multimedia software system that allows for the importing of third party files into an entity's workspace.

Another object of the present invention is to implement new application by installing a set of application specific XML files.

Another object of the present invention is to produce an XML to SQL translation layer that transforms database related scripts from XML into SQL statements.

Another object of the present invention is to produce an easily extensible multimedia software system that provides voice spectrum analysis while replaying a video file.

Another object of the present invention is to produce an easily extensible multimedia software system that provides a means to create an authorizing tool to dynamically create form fields, database fields, form layout and report layout and save them in XML files.

Another object of the present invention is to produce an easily extensible multimedia software system that creates a Video Object, wherein Video Object said is launched directly from the framework application and saves the captured video file directly into the entity work space.

Another object of the present invention is to produce an easily extensible multimedia software system that creates an application Server comprising a network manager and network manager backups, work flow engines, database servers and multimedia file servers, wherein said network manager or network manager backups direct network traffic from Web Interface computers to workflow engines for data application processing and acts as a workload balancer.

Another object of the present invention is to create identical databases in the client's machine as well as in the Application Server allowing merging of data records related to an entity from one to the other.

Another object of the present invention is to build a framework of standard multimedia features which are reusable by different applications. The feature list will include but not limited to the following items:

Recognizes the existence of multiple application plug-in modules in the form of XML files that contain information about the application specific database schema, GUI, information query fields and report. Based on the selected application plug-in module, the framework software will run the application specific functions along with its own core functions.

A user may choose which application to run at program start up.

User authentication of the program with user name and password.

Create accounts for each entity such as a patient or building permit.

Create, fill and save demographic data entry form for each entity.

Create multiple event sessions for each entity based on a time line.

Fill and save an event session detail form for each event entity.

Interface to a local database for saving and retrieving demographic, event session, third party and multimedia data information.

Capture image and video strips from camera via the USB-2 port of a PC and seamlessly save them in the database during each session.

Compress live video data into MPEG-4 format during recording.

Use voice commands to control the operation of the video and image capturing.

Present entity related session events and its associated captured multimedia content in a hierarchy timely manner.

Present multimedia recordings with icons in a map.

Simultaneously display and replay multiple windows of captured image and video on the same screen thus allowing comparison.

Post image processing with tools including color to grey scale conversion, zooming, brightness and contrast control, background enhancement and mark and annotation.

Provide video replay window with features such as frame by frame advancement, voice spectrum analysis, capturing replayed image and insert that back into the associated session.

Provide a user interface for searching a particular entity based on the application plug-in module specification.

Generate reports for each session based on the application plug-in module specification.

Create a multimedia message board for each entity so that authorized users can communicate on the same subject.

Create an audit trail of events.

Schedule timely database backup and restore database if needed.

Export entity information and its associated session data to CD and USB drive.

Import and display third party documents such as spreadsheet, engineering drawings into the database and associated them with the entity.

Another object of the present invention is to produce an easily extensible multimedia software system that can be used across a network, an intranet and the Internet.

Another object of the present invention is to produce an easily extensible multimedia software system, wherein said multimedia software system provides easily customizable application plug-ins.

Another object of the present invention is to produce an easily extensible multimedia software system that is compatible with contemporary management software systems.

Another object of the present invention is to produce an easily extensible multimedia software system that automatically files every multimedia recording of a user or client of a user.

Another object of the present invention is to produce an easily extensible multimedia software system that customizes data entry forms for various user applications.

Another object of the present invention is to produce an easily extensible multimedia software system that customizes databases for various user applications.

Another object of the present invention is to produce an easily extensible multimedia software system that comprises a database system for storing user client information, wherein said user client information comprising image and video.

Another object of the present invention is to produce an easily extensible multimedia software system that allows for the retrieval and display of post multimedia session data.

Another object of the present invention is to produce an easily extensible multimedia software system that allows for a multimedia analysis of post multimedia session data.

Another object of the present invention is to produce an easily extensible multimedia software system that provides for multimedia image processing of post multimedia session data.

Another object of the present invention is to produce an easily extensible multimedia software system that allows for the importing of data from third party files into a user client's workspace.

Another object of the present invention is to produce an easily extensible multimedia software system that provides special data entry forms and reports for multimedia sessions.

Another object of the present invention is to produce an easily extensible multimedia software system that allows user to conduct multimedia applications in the field and allow live data to be broadcast to other users in other locations via the Internet.

Another object of the present invention is to produce an easily extensible multimedia software system that allows third parties to review application analysis results.

Another object of the present invention is to produce an easily extensible multimedia software system that allows for the capture, organization, saving and broadcasting of multimedia data globally.

Another object of the present invention is to produce an easily extensible multimedia software system that does not require additional software coding to add new applications to the software framework.

Another object of the present invention is to produce an easily extensible multimedia software system that allows a user to implement new application by installing a set of application specific XML files.

Another object of the present invention is to produce an easily extensible multimedia software system that provides for an XML to SQL translation layer that transforms database related scripts from XML into SQL statements.

Another object of the present invention is to produce an easily extensible multimedia software system that provides a generic multimedia core database.

Another object of the present invention is to produce an easily extensible multimedia software system that provides a generic multimedia business specific database.

Another object of the present invention is to produce an easily extensible multimedia software system that integrates a generic multimedia core database and a business specific database.

Another object of the present invention is to produce an easily extensible multimedia software system that provides a means to create an authorizing tool to create form fields.

Another object of the present invention is to produce an easily extensible multimedia software system that provides a means to create an authorizing tool to dynamically create database fields.

Another object of the present invention is to produce an easily extensible multimedia software system that compresses live video data.

Another object of the present invention is to produce an easily extensible multimedia software system that creates an audit trail of events.

Another object of the present invention is to produce an easily extensible multimedia software system that simultaneously display and replay multiple windows of captured images and video on one viewing screen.

Another object of the present invention is to produce an easily extensible multimedia software system that provides a means to create an authorizing tool to dynamically create form fields, database fields, query form fields and report form fields and save them in XML files.

Another object of the present invention is to produce an easily extensible multimedia software system that provides a means to render data in the XML files into form fields, query form fields and report fields.

Another object of the present invention is to produce an easily extensible multimedia software system that creates a Video Object, wherein Video Object said is launched directly from the framework application and saves the captured video file directly into the entity work space.

Another object of the present invention is to produce an easily extensible multimedia software system that creates an Internet Application server for handling various multimedia applications, wherein said applications utilize XML based Plug-In-Module (PIM).

Another object of the present invention is to produce an easily extensible multimedia software system that creates an Internet Server comprising a network manager and network manager backups, wherein said network manager or network manager backups direct network traffic from Web Interface computers to workflow engines for data application processing.

Another object of the present invention is to produce an easily extensible multimedia software system that creates an Internet Server comprising a network manager and network manager backups, wherein said network manager or network manager backups act as a workload balancer and a fault safe machine switcher.

Another object of the present invention is to produce an easily extensible multimedia software system that provides a means to create an authorizing tool to create database fields.

It is an object of the present invention to overcome the previously mentioned shortcomings found in the prior art of endoscopic camera systems to introduce an endoscopic examination software system that allows users to use endoscopic cameras with personal computers.

Another object of the present invention is to produce an endoscopic examination software system that allows medical students to observe live surgery and examinations remotely while professors can make comments by multimedia communication in real time.

Another object of the present invention is to produce an endoscopic examination software system that allows third parties, such as insurance companies to examine and diagnose results.

Another object of the present invention is to produce an endoscopic examination software system that allows for the capture, organizing, saving and broadcasting of multimedia data globally.

Another object of the present invention is to produce an endoscopic examination software system that does not require additional software coding to add new applications to the software framework.

Another object of the present invention is to produce an endoscopic examination software system that allows a user to implement new application by installing a set of application specific XML files.

Another object of the present invention is to produce an endoscopic examination software system that provides for an XML to SQL translation layer.

Another object of the present invention is to produce an endoscopic examination software system that provides for an XML to SQL translation layer that transforms database related scripts from XML into SQL statements.

Another object of the present invention is to produce an endoscopic examination software system that provides a generic multimedia core database, business specific database and the interface between them.

Another object of the present invention is to produce an endoscopic examination software system that provides a means to create an authorizing tool to create form fields.

Another object of the present invention is to produce an endoscopic examination software system that provides a means to create an authorizing tool to dynamically create database fields.

Another object of the present invention is to produce an endoscopic examination software system that compresses live video data.

Another object of the present invention is to produce an endoscopic examination software system that creates an audit trail of events.

Another object of the present invention is to produce an endoscopic examination software system that schedules timely database backup and restores a database when desirable.

Another object of the present invention is to produce an endoscopic examination software system that records data onto storage media, including but not limited to CD, DVD, USB flash memory, any solid-state drive, any movable part storage media drive.

Another object of the present invention is to produce an endoscopic examination software system that uses voice commands to control the operation of the camera.

Another object of the present invention is to produce an endoscopic examination software system that presents multimedia recordings with icons in a map.

Another object of the present invention is to produce an endoscopic examination software system that simultaneously display and replay multiple windows of captured images and video on one viewing screen.

Another object of the present invention is to produce an endoscopic examination software system that provides voice spectrum analysis.

Another object of the present invention is to produce an endoscopic examination software system that compresses live video data into MPEG-4 format.

Another object of the present invention is to produce an endoscopic examination software system that provides a means to create an authorizing tool to dynamically create form fields.

Another object of the present invention is to produce an endoscopic examination software system that creates a Video Object.

Another object of the present invention is to produce an endoscopic examination software system that creates a Video Object, wherein said Video Object is launched directly from the framework application and saves the captured video file directly into the entity work space.

Another object of the present invention is to produce an endoscopic examination software system that creates a Video Object that captures Live Video from any USB-2 camera.

Another object of the present invention is to produce an endoscopic examination software system that creates an Internet server for handling various multimedia applications, wherein said applications utilize XML based Plug-In-Module (PIM).

Another object of the present invention is to produce an endoscopic examination software system that creates an Internet Server comprising a network manager and network manager backups, wherein said network manager or network manager backups direct network traffic from Web Interface computers to workflow engines for data application processing.

Another object of the present invention is to produce an endoscopic examination software system that creates an Internet Server comprising a network manager and network manager backups, wherein said network manager or network manager backups act as a workload balancer—fault safe machine switcher.

Another object of the present invention is to produce a method to create an Internet Server comprising a network manager and network manager backups, wherein said network manager or network manager backups direct act as a workload balancer and fault safe machine switcher.

These together with other objects of the invention, along with various features of novelty which characterize the invention, are pointed out with particularity in the claims, Detailed Description of the Embodiments Sections and drawings of this application, with all said sections also adding to this disclosure.

BRIEF DESCRIPTION OF THE DRAWINGS

Advantages of the present invention will be apparent from the following detailed description of exemplary embodiments thereof, which description should be considered in conjunction with the accompanying drawings, in which:

FIG. 9 illustrates a detail search screen for a specific customized multimedia plug-in application, wherein all the search fields for a user to select from are dynamically generated from the XML file specific to the required fields for this customized multimedia plug-in application.

FIG. 9a illustrates a search result screen for a specific customized multimedia plug-in application, wherein all the result sorting columns are dynamically generated from the XML file specific to the required fields of this customized multimedia plug-in application.

FIG. 10 illustrates a workspace screen for a specific customized multimedia plug-in application, wherein all the fields for data entry are dynamically generated from a data XML file specific to the required fields of this customized multimedia plug-in application.

FIG. 11 illustrates a session screen for a specific customized multimedia plug-in application, wherein all the fields for data entry are dynamically generated with XML based data fields specific to the required fields of this customized multimedia plug-in application.

FIG. 11a illustrates a second session screen for a specific customized multimedia plug-in application, wherein all the fields for data entry are dynamically generated specific to the required fields of this customized multimedia plug-in application.

FIG. 12 illustrates an additional customized information display screen for a specific customized multimedia plug-in application, wherein the columns sorting the type of information displayed are dynamically generated specific to the required fields of this customized multimedia plug-in application.

FIG. 18 illustrates a generated text report screen, specific to the parameters of a customized multimedia plug-in application.

FIG. 19 illustrates a user-manager account management screen, wherein the user-manager can view which users are allowed access to the multimedia application.

FIG. 29 illustrates an embodiment of the database design form.

FIGS. 31a and 31b illustrate an embodiment of the graphical user interface used to design a demographic data entry form layout with the Plug-In Tool layout tool.

FIGS. 32a and 32b illustrate an embodiment of the graphical user interface used to design a session data entry form layout with the Plug-In Tool layout tool.

FIG. 34 illustrates the XML script that describes an I/O field of a form.

FIG. 35 illustrates an embodiment of the graphical user interface used to design a report layout with the Plug-In Tool layout tool.

FIG. 37 illustrates an embodiment of the graphical user interface used to design a detailed query form layout with the Plug-In Tool layout tool.

DETAILED DESCRIPTION OF THE DISCLOSED EMBODIMENTS

Figure 1:
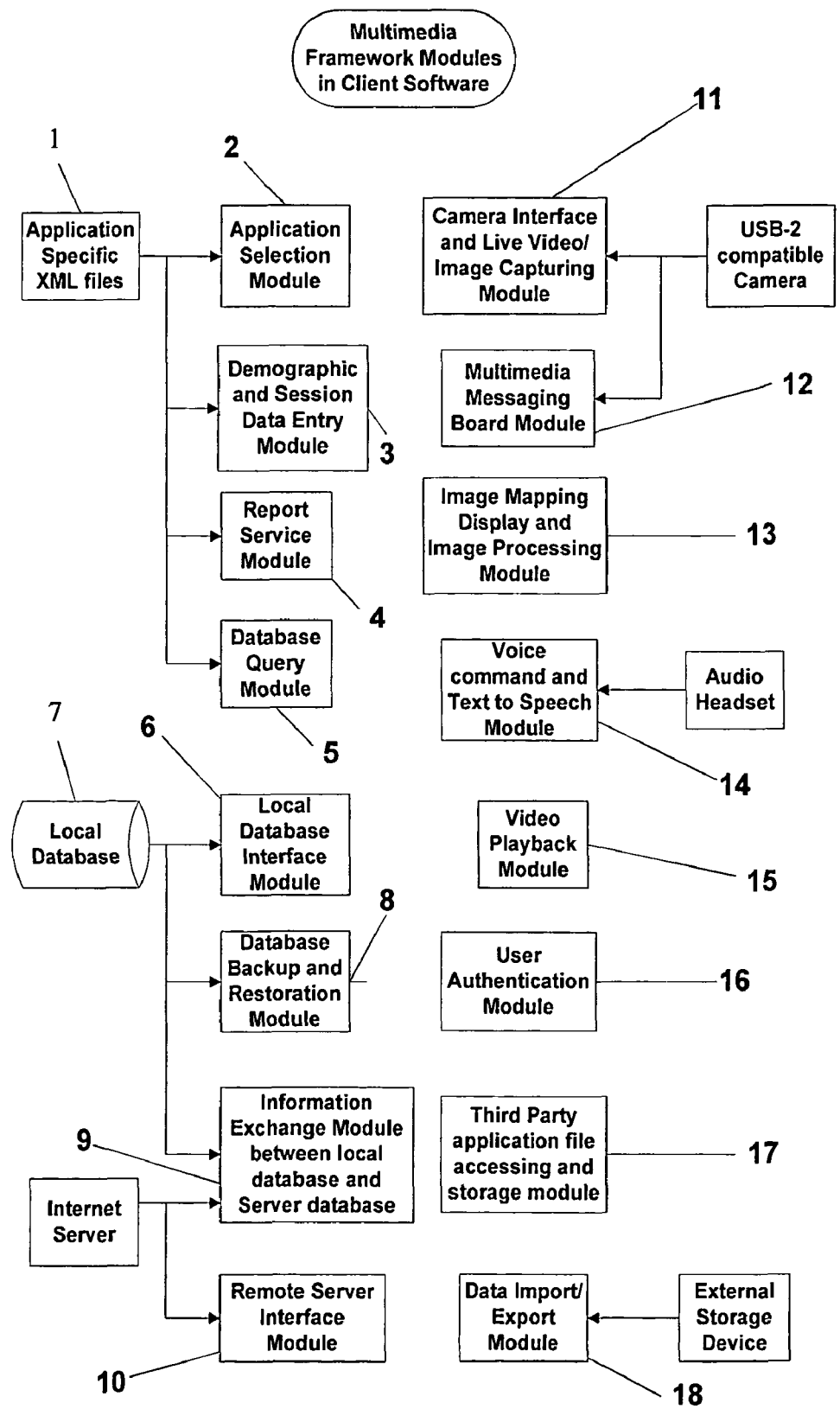
FIG. 1 illustrates the different software modules that compose the multimedia framework features on a single computer.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention, such as windows involving visual interfaces of different colors, shapes, features and with various combinations of component layouts.

The present invention provides a multimedia framework software system designed to follow the theme of "Design Once, Apply All" where a set of common multimedia features are designed and embedded in a framework which are used by all other applications. Each application is created from a set of XML files known as the Application Plug In Module. The present invention also provides a generic Multimedia Server with a cluster of computers that is designed to host different applications in a distributed resource architecture which can meet unlimited growth without any programming effort.

In one embodiment of the subject invention, the Application Plug-In Module (APIM) is a set of extensible markup language (XML) files, which specifies the layout of the database table, data entry, query, and report forms.

In another embodiment of the subject invention, an entity is the subject a user wants to organize in his or her APIM. For example, the entity may be a patient, a sales account, a building permit or a personal event.

In a further embodiment of the subject invention, a work space is defined as a computer environment in which a user will work and elaborate on an entity. For example, if the APIM is for a clinic and the entity is a patient, the multimedia framework lets the user create a database to save patient information, create data entry, query and report forms for the patient, save examination multimedia data, and create patient related messaging boards between different care providers.

In another embodiment of the subject invention, the demographic data is the general information about an entity. If the entity is a building permit, then the demographic data is the building permit number, site address, reason for the permit, building owner info and so forth. For a patient, the demographic data may be the patient ID number, patient info, type of sickness, physician and so forth.

In a further embodiment of the subject invention, the session data is the information recorded during every entity event. In one embodiment of the subject invention, every time a patient (the entity) visits a doctor, it is a session. Any medical tests performed on the patient may be recorded as session data during that session.

In another embodiment of the invention, the software database will have two tables that are specific for saving the demographic and session data.

FIG. 1 illustrates the different software modules that compose the multimedia framework features on a single computer. The Application Plug-In Module 1 is a set of XML files, which specifies the layout of the database table, data entry, query, and report forms. When a new application is launched, a set of related XML files will run. An Application Plug-In Module Designing Tool assists a user in generating a set of XML files to be installed in the Multimedia framework computer. The Application Plug-In Module Designing Tool will generate XML files for: 1) Identifying the database fields in a demographic table; 2) Identifying the query fields in a Greeting Screen; 3) Identifying the query fields in a Detail Search Screen; 4) Identifying the display fields in a Searched Result Screen; 5) Identifying the data entry fields in a Demographics Data Entry form; 6) Identifying the data entry fields in a Session Detail Data Entry form; and 7) Identifying the fields in a Session report. The Designing Tool will allow a user to create a new application that includes the creation of the above XML files.

There are two types of Application Plug-In Module designing tools, the Database Designing Tool and the Form Layout Designing Tool.

The Database Designing Tool specifies the fields in a demographic table and a session detail table. The user can specify the field name, type (e.g. variable character, and integer), drop down options, key field and search options. The search option feature allows searches in a field for exact word matching or matching any word in a space limited string. Every time a field is added or deleted during the designing phase, the associated tables in the database will be updated. The demographic table must include a variable character key field to identify an entity. No other fields in the demographic table can be a key field. The session detail table must include a foreign key field related to the entity key field of the demographic table. It must also include a Date/Time key field to identify the session date and time.

The Form Layout Designing Tool is used to layout data entry fields in the data entry forms, query forms and reports. These data entry fields can be labels, text boxes, combo boxes, groups, images, and lines. Each data entry field must be related to a database data field in either the demographic table or the session detail table. Each data entry field may have various features such as a text box must always be filled with data or a drop down option of a combo box must always include all the previous entries. The field specification of each form is saved in one of the above XML files. At run time, the data entry fields in the forms are created dynamically from the XML stream derived from the above XML files. In a client/Internet Server situation, the XML stream is downloaded from the server to the client to create the form. Each form will have some other standard data entry fields and buttons to perform the core multimedia functions.

Application Selection Module 2 selects the appropriate installed application for execution.

Demographic and Session Data Entry Module 3 for displaying data entry forms from XML files as well as saving and retrieving data from/to the database. Since the data entry field property of a form is recorded in an XML file, one can display the data entry form by recalling each field of the XML file to reconstruct the data entry field. The XML file is submitted to the XML to SQL Translation layer which translates the database association of each data entry field into SQL statements for database storage and query. The resulting database data will be fed back to each data entry field in the data entry form for display.

The advantage of such approach is the software program does not need to know the nature of the application. All that is required is 1) the code to build the XML to SQL layer; 2) the design layout tools to define the database table and data entry form layouts and to transform the layouts into XML files; and 3) the code to build database tables, data entry forms and database query statements from the XML script. By going through this XML transformation process, a new application can be built by a user without any writing any new code. It makes application automation possible.

Report Service Module 4 for displaying and printing Session reports from XML based form layouts and databases.

Database Query Module 5 for generating dynamic SQL database statements from XML files to retrieve data from the database based on search criteria.

Local Database Interface Module 6 communicates with both the core tables and the application specific table in a local database. Each application has two sets of database tables. One set of database tables is static and its schema never changes. These database tables are used to save the generic information about the business operation. Information about the business operation can be the location of the multimedia files, third party files and user account name and passwords. The other set of database tables is dynamic and its schema differs from application to application. These database tables contain an entity's demographic and session data. For example, a patient demographic data differs from a building permit's demographic data and thus they need to be built separately in order to be automated. The static and dynamic database tables are related by a common entity number which represents the business client object that these tables are based upon. The entity number can be a patient ID or a lawyer's docket number for a client's case.

Local Database 7 is created from the dynamic SQL statements generated from the XML file and from the SQL statements defining the core multimedia tables Database backup and restoration Module 8 automatically backs up the entire database in a timely fashion and restores it if needed.

Information Exchange Module 9, between the Local Database and Server Database, merges, splits, uploads, and downloads table records. The Multimedia Framework will have identical databases installed in the client computer and the Application Server. The reason for identical databases is to allow a client computer to process entity related transactions against the local database in the absence of a network connection. When a network connection is available, the same information in the local database will be merged with the Application Server database which is accessible by other network users.

Remote Server Interface Module 10 communicates with the Remote Application Server via the Internet or LAN by Web Service and .NET Remoting.

Camera Interface and Live Video/Image Capturing Module 11 displays a Live Video window with video streams coming from a USB2 connected camera. This Module controls the video and image capturing sequence and associates the captured media with the current entity's work space.

Multimedia Messaging Board Module 12 allows multimedia and text messages to be shared among users in an entity's work space.

Image Mapping Display and Image Processing Module 13 displays image and video thumbnails in a map. This Module also provides tools to process an image such as zooming, contrast and brightness control, grey scale, mark and annotation and background enhancement.

Video Payback Module 15 replays an entity's associated video file on a window with features allowing video freeze, frame advancement, image capturing and sound spectrum analysis.

Voice Command and Text to Speech Module 14 allows voice commands to control the video file capture from a live video stream and to save the stream into the current entity's work space. The text to speech feature allows repetition of the voice command to confirm the command has been recognized.

User Authentication Module 16 sets up user accounts and verifies user name and password at application log in.

Third party application file accessing and storage module 17 imports third party files into the work space of an entity and share the files with other users on a network.

Data Import/Export Module 18 saves all information about the work space of an entity including database records and multimedia files on CDs. The same information can be restored back into the application if needed.

Figure 2:
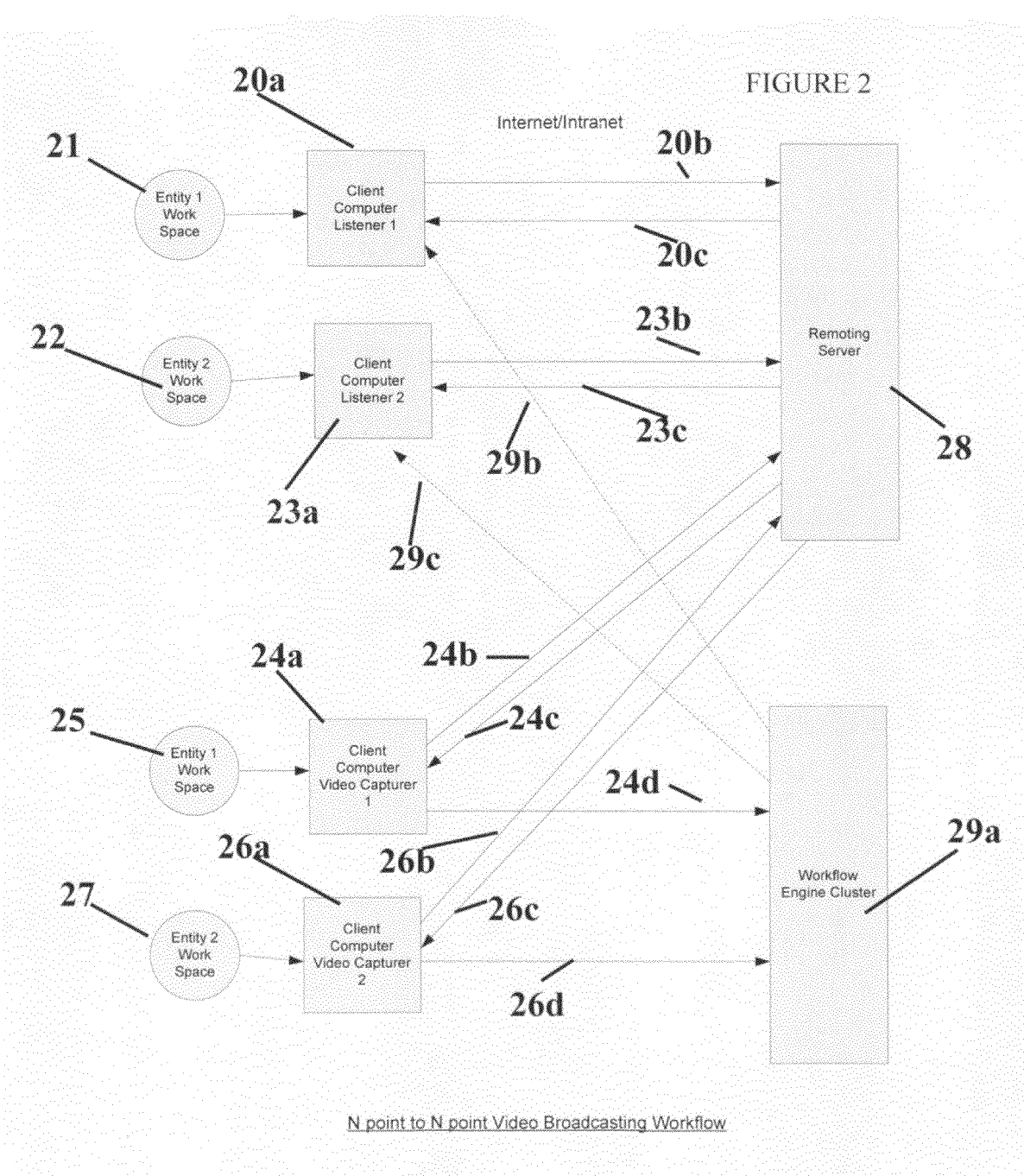
FIG. 2 illustrates the workflow for allowing n point to n point broadcasting of newly captured video files.

FIG. 2 illustrate the workflow for allowing n point to n point broadcasting of newly captured video files.

In the Application Server, there is a Remoting Service Computer and a cluster of Work flow computers. The Remoting Service computer exposes a set of service functions to the external clients on the network. The function of the Remoting Service computer is to switch short messages among the Application server and the client(s). The function of the Workflow computer cluster is to transport huge multimedia files between the client computer(s) and the Application Server.

FIG. 2 shows two client Listening Computers 20a and 23a on the network. The first listening computer 20a runs an application with the current work space for a first Entity 21. When a work space starts, a data entry form is launched and it automatically registers 20b a callback address (IP address based) to the remoting server 28.

Similarly, a second Listening Computer 23a runs an application with the current work space for a second Entity 22. When a work space starts, a data entry form is launched and it automatically registers 23b a callback address (IP address based) to the remoting server 28.

Concurrently, a first Client Computer Video capturer 24a is in the same state as the first Listening Computer 20a and a second Client Computer Video capturer 26a is in the same state as the second Listening Computer 23a.

The first Client Computer Video capturer 24a captures a new video file and sends a message 24b to the Remoting Server 28 that a new video file has been captured for the first entity 21. The Remoting Server 28 locates the least busy Work flow engine in the Work flow cluster 29a within the Application Server network and sends 24c the engine's callback address (IP based) back to the first Client Computer Video capturer 24a. The first Client Computer Video capturer 24a will directly send 24d the newly captured file to the least busy Work flow engine's call back address and be saved in the server's multimedia file depository. After the file transfer is finished, the engine will signal the Remoting Server 28 to save the information about the new multimedia file related to the current entity in the database. The Remoting server 28 will issue 20c an event to the callback address of the client(s) with an active work space opened for the first entity 21. Upon receiving the message about the new multimedia file, entity ID and IP address of the least busy workflow engine, the first listening computer 20a will download 29b the new video file directly from the least busy workflow engine and display that on a window.

Such real time workflow of capturing and replaying new video across the network works when a group of client computers are working on the same entity's work space. Similarly, other channels can be added when another group of client computers are working on a different entity's work space. The following new channel can be added in parallel with the one described above.

The second Client Computer Video capturer 26a captures a new video file and sends a message 26b to the Remoting Server 28 that a new video file has been captured for the first entity 21. The Remoting Server 28 locates the least busy Work flow engine in the Work flow cluster 29a within the Application Server network and sends 26c the engine's callback address (IP based) back to the second Client Computer Video capturer 26a. The second Client Computer Video capturer 26a will directly send 26d the newly captured video file to the least busy Work flow engine's call back address and be saved in the server's multimedia file depository. After the file transfer is finished, the engine will signal the Remoting Server 28 to save the information about the new multimedia file related to the current entity in the database. The Remoting server 28 will issue 23c an event to the callback address of the client(s) with an active work space opened for the second entity 22. Upon receiving the message about the new multimedia file, entity ID and IP address of the least busy workflow engine, the second Computer Listener 23*a* will download 29*c* the new video file directly from the least busy workflow engine and display that on a window.

The following description illustrates the implementation of the Application Server on a generic set of a PC cluster and to partition the system resources for different applications without any programming effort.

Figure 3:
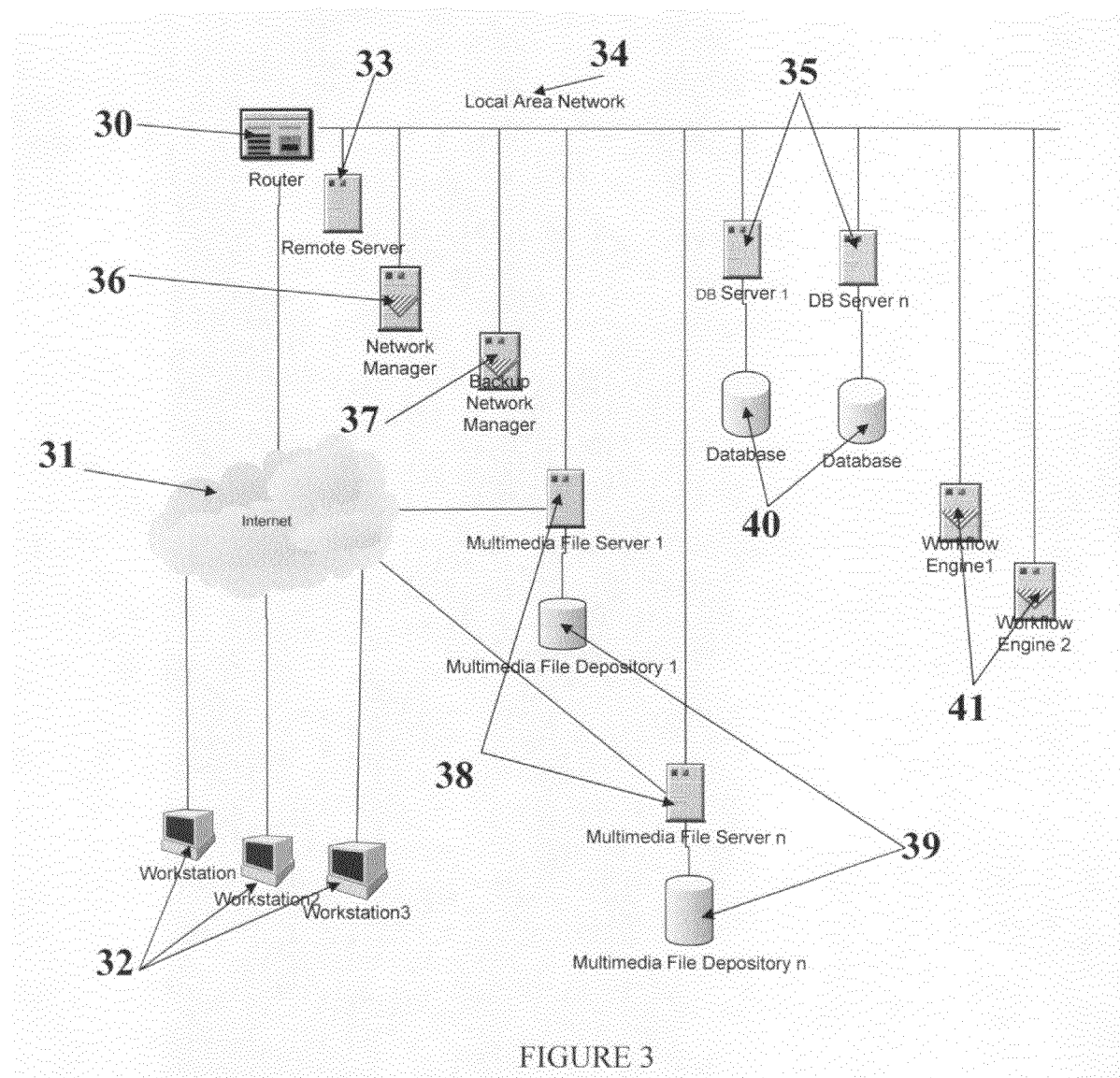
FIG. 3 illustrates the Application Server configuration with distributed processing technology.

FIG. 3 illustrates the Application Server configuration with distributed processing technology.

In a multimedia framework, an Application server saves all the application data in a centralized location with multiple databases. These databases are scattered among multiple disk storage 35 in multiple computers 40 serving different client applications. There are numerous workflow Engine computers 41 to process different incoming multimedia jobs with access to the scattered databases.

Multimedia files for video and image are too large to be saved in the database. They are saved in the file depository system 39 of several computers 38 known as the Multimedia Server.

To coordinate job activities, a Network Manager 36 is installed. At system power up, all the network computers will register their identities and their call back addresses to the Network Manager. When a job request is received from a Remote Server, it is sent to the Network Manager which will assign the appropriate Workflow Engine computer 41 to handle the job. When a job is finished, the Network Manager is notified and it will route the job result to the job requesting workstation 32.

This distributed Server Architecture will allow the Network Manager 36 to act as a workload balancer. Because the Network Manager knows every computer on the network and their working status, it can easily assign jobs to the one computer that is least busy.

The active Network Manager 36 is backed up with a redundant Network Manager 37 that always monitors the formers' health. In case the former fails to function, the latter will be activated.

The workflow engine 41 is a computer that processes a job. The program that runs on the workflow engine is based on the concept of sequential workflow and business rules. A workflow is a process to perform a function such as video file downloading, and entity query. There are standard business rules that govern the process. These rules are saved in a rule library and are selected to perform in different job occasions.

The Remote Server 33 is the front end of the Application server. It provides the service functions to handle jobs from the Internet/Intranet connected workstations 32. All jobs are relayed to the workflow engines 41 for processing.

Figure 4:
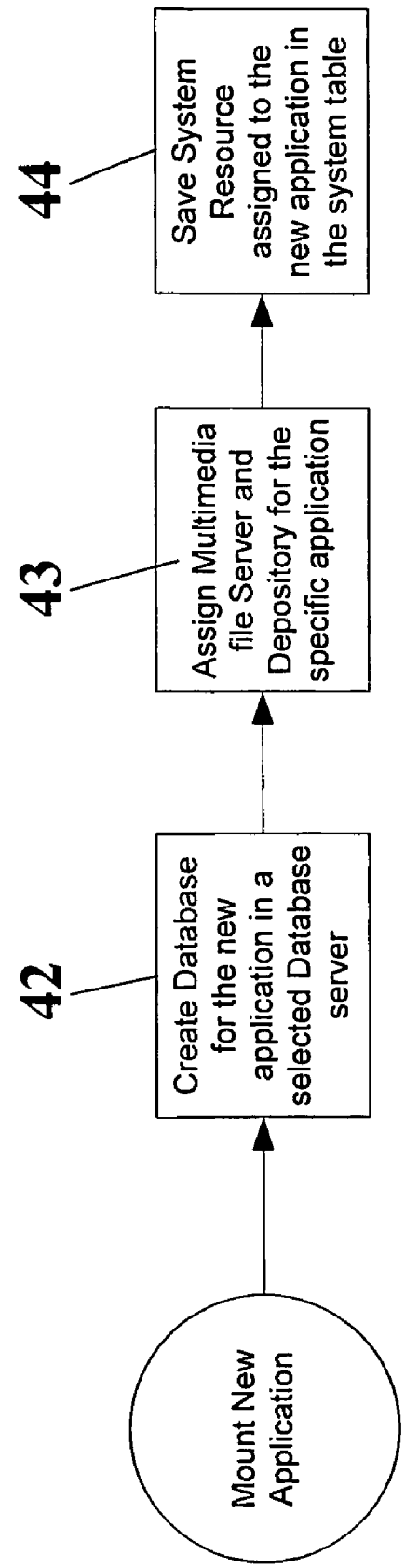
FIG. 4 illustrates the procedure to implement a new application in the System Server.

FIG. 4 illustrates the procedure to implement a new application in the System Server.

First, the system operator must decide which system resources, including the Database Server 35, Database 40, Multimedia File Server 38 and Multimedia File Depository 39, must be assigned to the new application. Second, a database for the new application will be installed 42 in the selected database 40. This includes the multimedia standard tables and the application specific tables derived from the Application Plug-In Module. Third, a specific file directory must be created 43 in the selected Multimedia File Server for saving multimedia media and the new Application Plug-In Module. Fourth, the assignment of the selected database and Multimedia File Server for the new application will be saved 44 in the system database for later reference.

Figure 5:
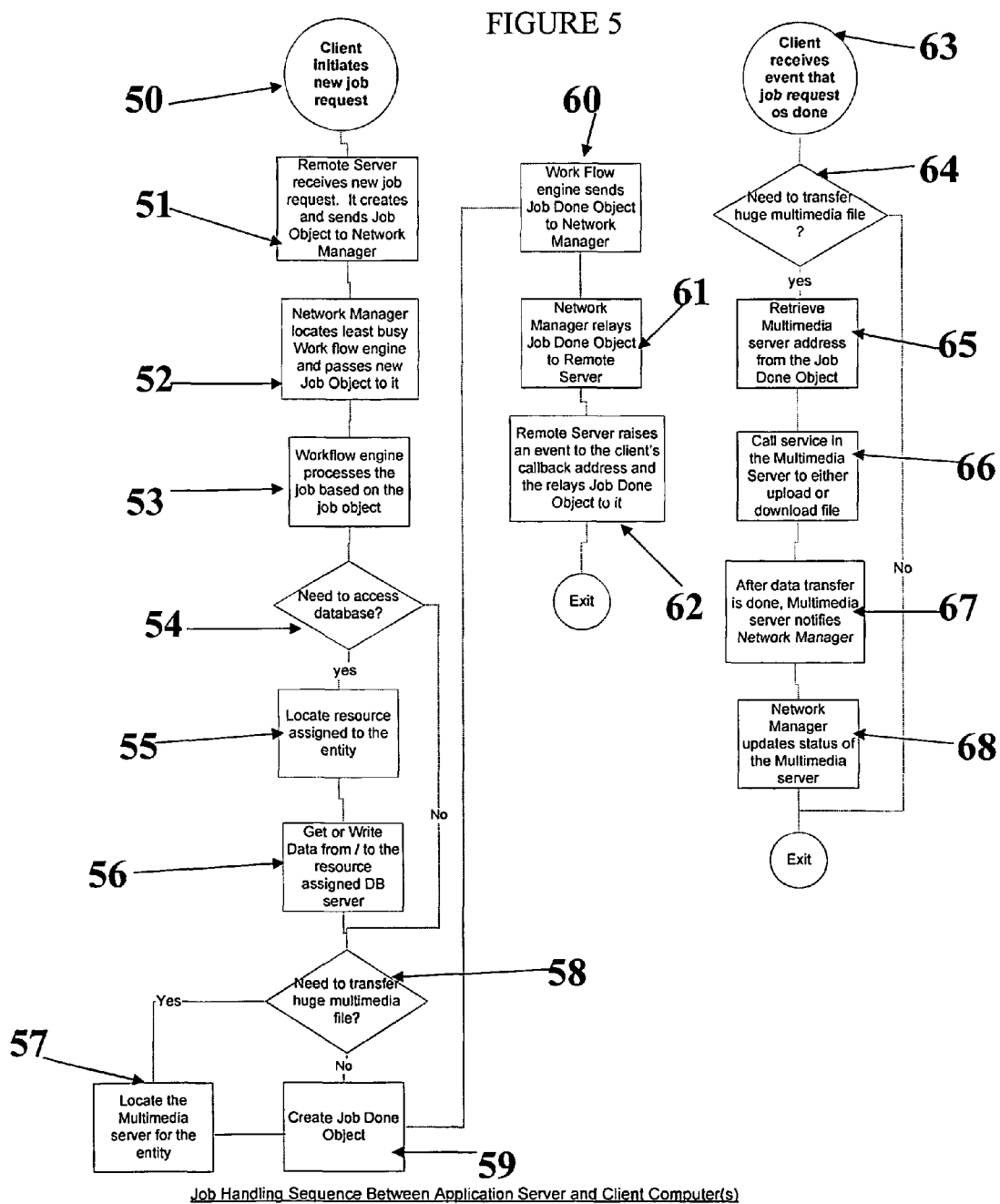
FIG. 5 illustrates the Job Handling Sequence between the client workstations and the Application Server.

FIG. 5 illustrates the Job Handling Sequence between the client workstations 32 and the Application Server. The client workstation 32 sends a job request 50 to the Remote Server front end of the Application Server 33. The Remote Server 33 receives the job request 51 and packs the call back address of the client work station 32 and the job request information into a Job Object. It sends the Job Object to the Network Manager 36. The Network Manager 36 locates the least busy Workflow Engine 41 from its internal Workflow Engine list and relays the Job Object to it 52. It also increments the job count for that Workflow Engine. The Workflow Engine 41 then processes the job 53 based on the information in the Job Object. If the job requires database access 54, it will locate 55 the system resources assigned to the application and entity included in the Job Object. The resource allocation information was created during the application implementation phase and was saved in the system database. The Workflow Engine 41 knows 56 what database server was assigned to the job and accesses information with it to finish the job. If the job requires data transfer of multimedia files 58, it will locate 57 the Multimedia Server 38 that handles the job based on the application/entity information. The Workflow Engine 41 packages the original Job Object 59, the new Job Processing Result and the optional Multimedia Server 38 information into a Job Done Object. The Workflow Engine 41 sends the Job Done Object 60 to the Network Manager 36. If the job does not require any multimedia file transfer, it will decrement the job count for the Workflow Engine in its internal Workflow Engine list. The Network Manager 36 sends the Job Done Object 61 to the Remote Server. The Remote Server will raise an event 62 to the callback address of the job requesting workstation 32 and send the Job Done Object to it. The job requesting workstation 32 receives the Job Done Object 63 and processes it. If the job requires multimedia file transfer 64, it will retrieve 65 the information about the Multimedia Server 38 form the Job Done object. The job requesting workstation 32 will make direct connection 66 with the Multimedia Server 38 and transfer the multimedia file. After the multimedia file transfer is done 67, the Multimedia Server 38 will notify the Network Manager 36 that the final phase of the job is finished. The Network Manager 36 will decrement the job count 68 for the related Workflow Engine and the Multimedia Server in its internal list.

The following description illustrates an embodiment of capturing and recording a live video feed from a USB2-port connected camera and directly linking the feed to the entity's work space.

Figure 6:
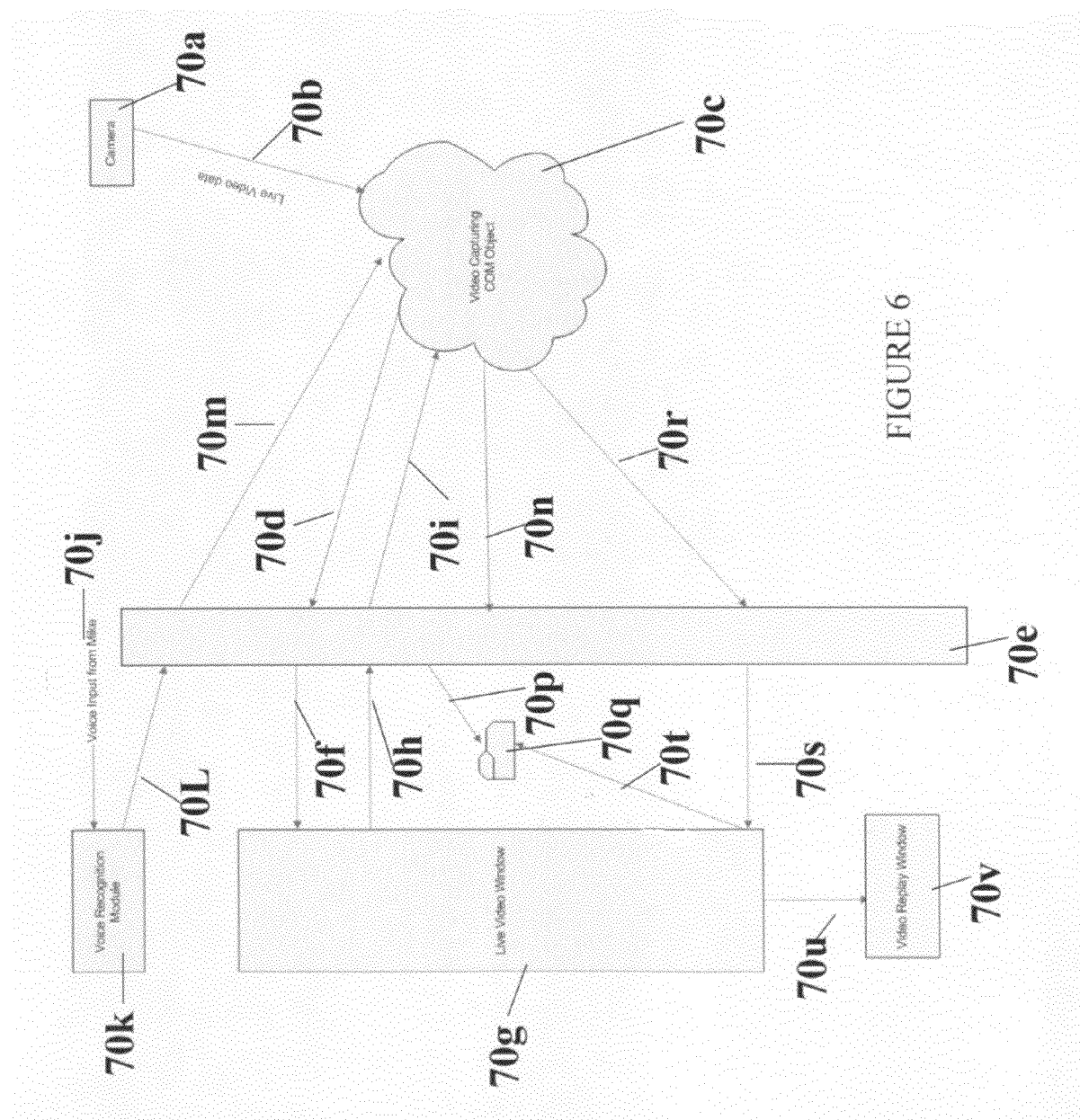
FIG. 6 illustrates the camera capturing workflow.

FIG. 6 illustrates the camera capturing workflow by numbers. The multimedia framework program allows a camera connected to the USB port of a computer to be controlled by command. Such commands may be: to display a window of Live video, to start recording video to a file, to stop recording, to choose the Codec for video compression, to take still images periodically and to control camera operation by voice recognition. A user needs to train his/her voice before the computer recognizes the commands. A Video COM object 70 is created with an exposed interface for executing user commands. This COM object is launched within the workspace of an application. When a video file or image is captured, it is automatically associated with the current entity's workspace, session and the database tables. It utilizes voice commands to control the camera during the session, to auto-setup an entity profile and session, and to auto-save multimedia information to the local database.

Figure 10:
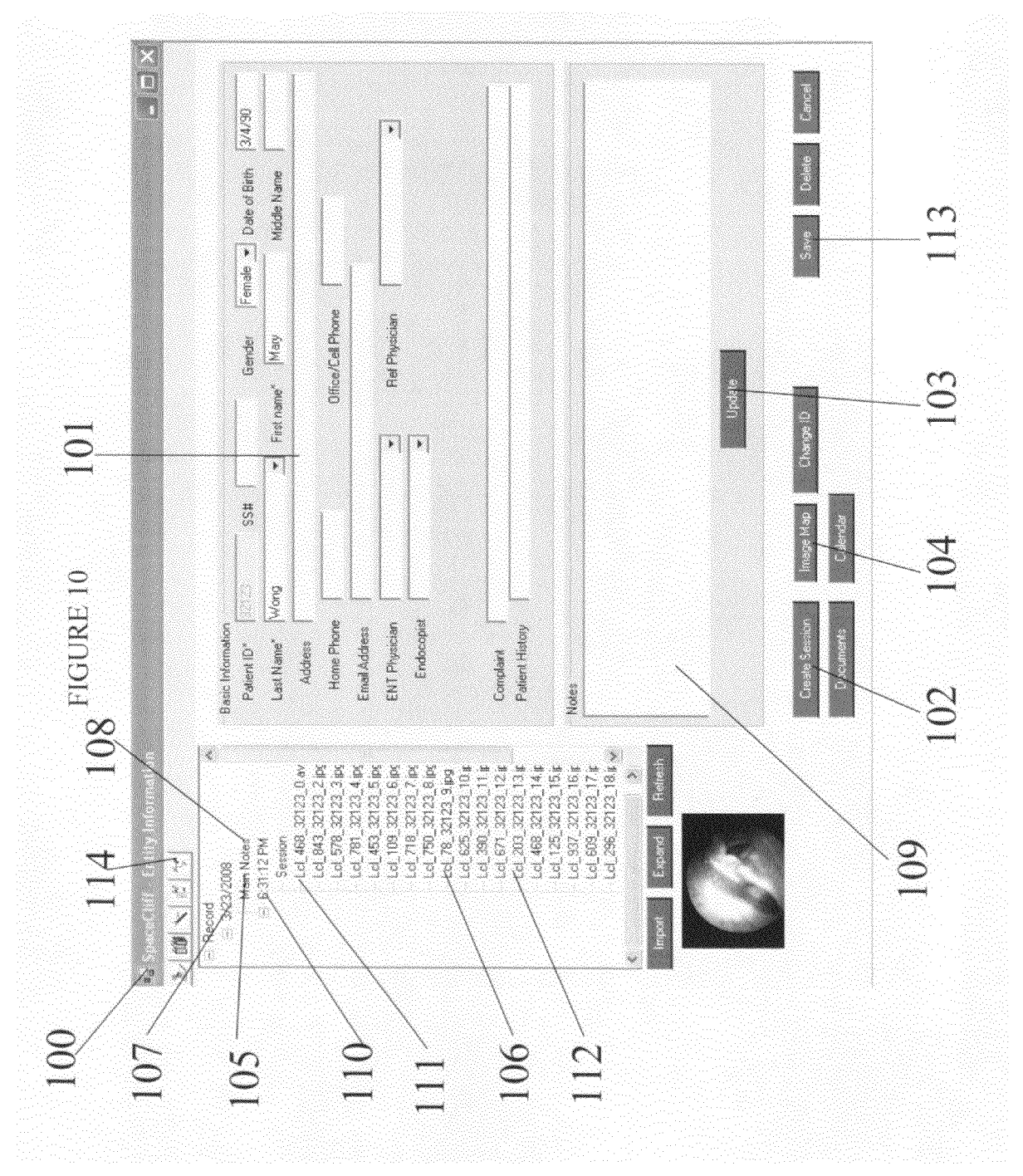
Figure 13:
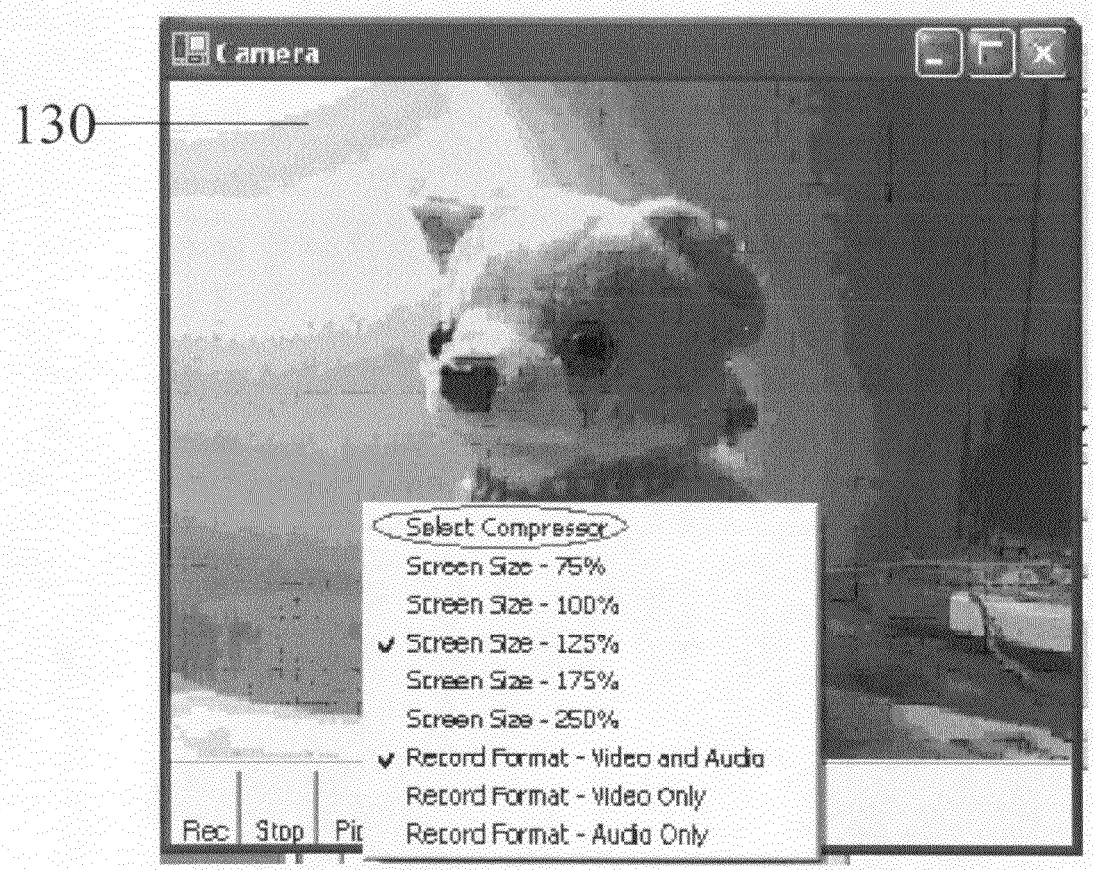
FIG. 13 illustrates a live video/camera screen, wherein the video capturing parameters of a live video capturing session may be selected.

There are three prerequisite conditions before a live video can be captured. First, the computer state must be inside the workspace window 100 (as shown in FIG. 10) of a known entity and session. Second, the camera must be connected to the computer by a USB-2 port or another connection. Third, a video Capturing COM Object (part of the multimedia framework feature) is launched and a Live Video Window (as shown in FIG. 13) is displayed.

Following the logic path in FIG. 6, Live Video data 70b from a camera 70a is streamed 70d from the Capturing COM Object 70c to through the server 70e and streamed 70f onto a computer and displayed on a Live Video Feed window 70g. A user may issue a command 70h from the Live Video Feed window to start capturing the video feed. This command 70i is sent to the COM Object which starts to compress the video data 70n with the selected codec and save the video feed 70p to a file 70q. (5) Alternately, a user can speak to a microphone or other voice recognition device 70j and issue a voice command to the voice recognition module 70k which issues the voice command 70L to the server and then 70m the COM object to start recording and saving the video feed 70p to file 70q. The COM object generates an event 70r to signal the program that the video file is ready. Upon receiving the signal 70s, the program will move the video file 70t to its file 70q and index the video file by the entity ID and session time. A user later can retrieve 70u the same video file for display on the Video replay window 70v with the same entity ID and session time.

The following description illustrates the workflow of an embodiment of the subject invention:

There are six entity-related user interface screens. The fields in these screens are dynamically generated based on the APIM information.

Figure 7:
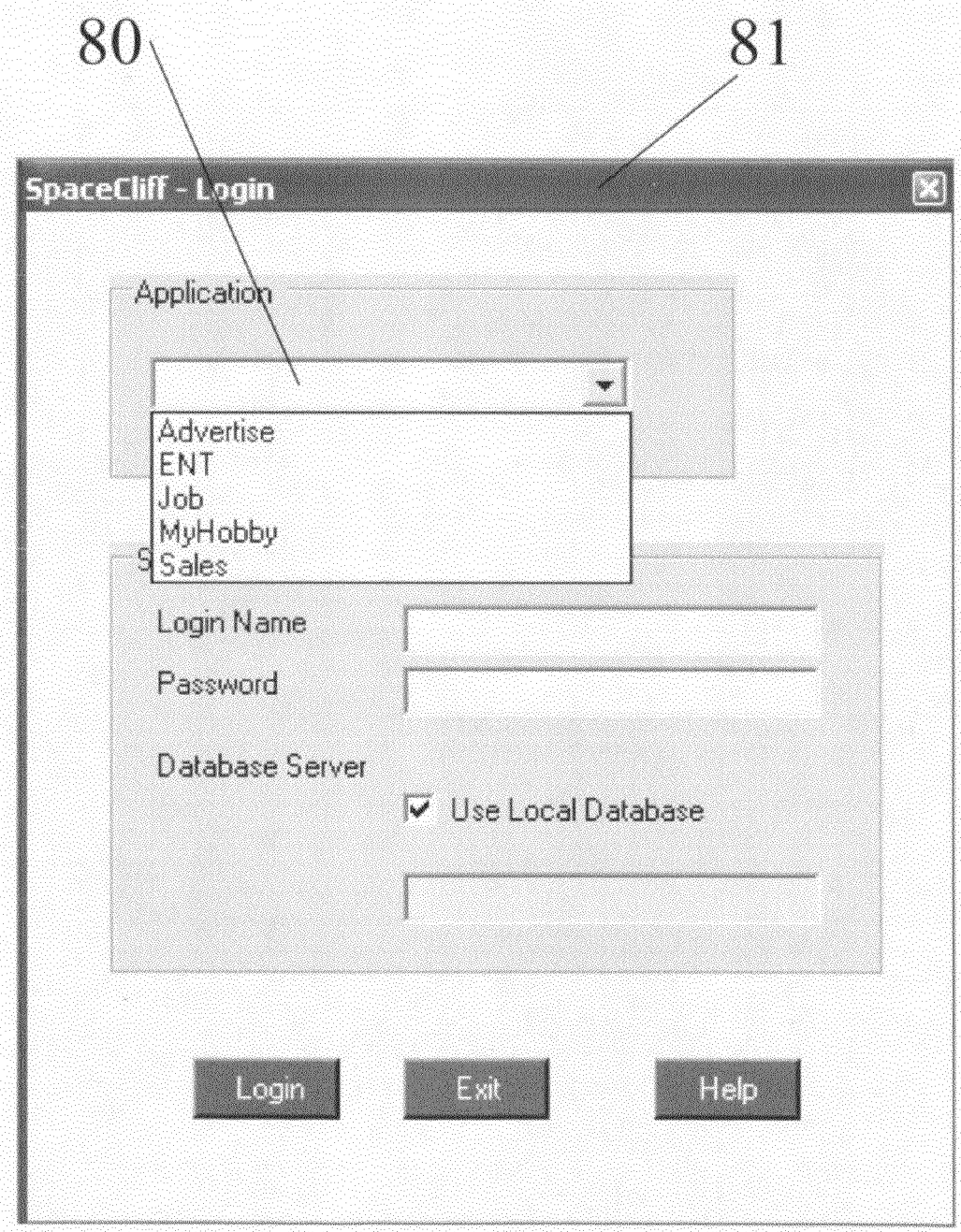
FIG. 7 illustrates a login screen, wherein the user selects one of the previously customized multimedia plug-in applications.

First, the login screen 81 illustrated in FIG. 7, wherein a user logs into the multimedia system by first selecting an available multimedia developer application or customized multimedia plug-in application from an application selection field 80. As shown in FIG. 1, a user may select from the plug-in application from a drop-down menu.

Figure 8A:
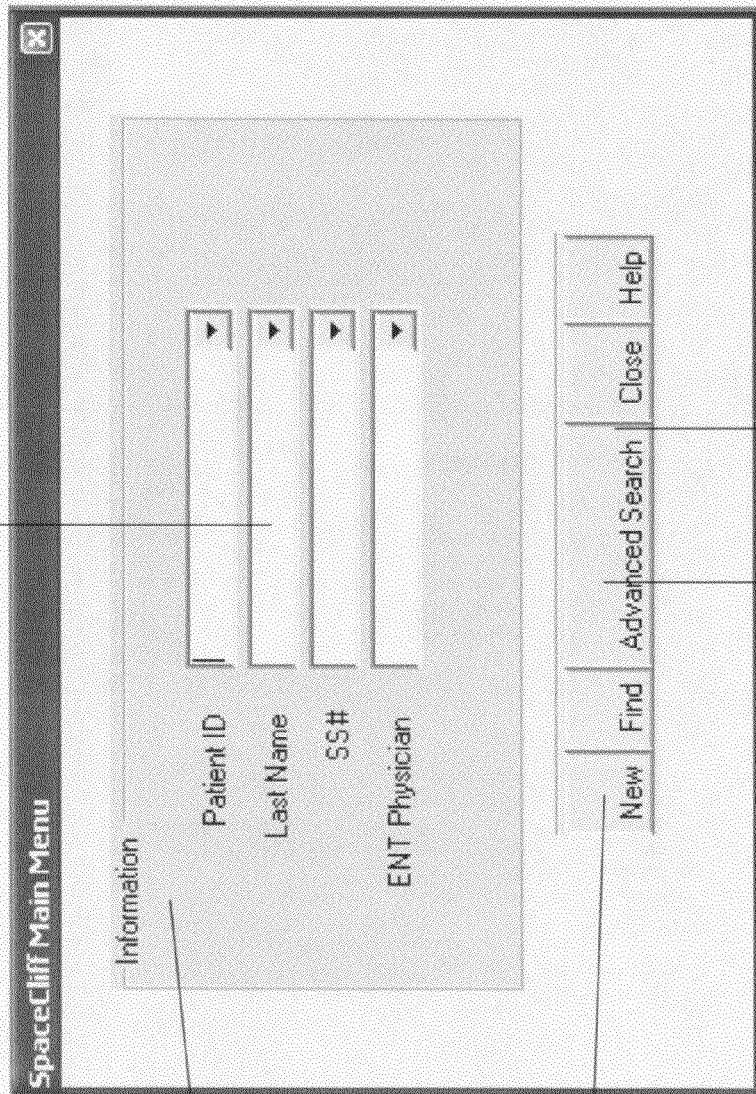
FIG. 8a illustrates the opening screen for a customized multimedia plug-in application, wherein several dynamically created fields and tool buttons specific to this customized multimedia plug-in application are shown.
Figure 8B:
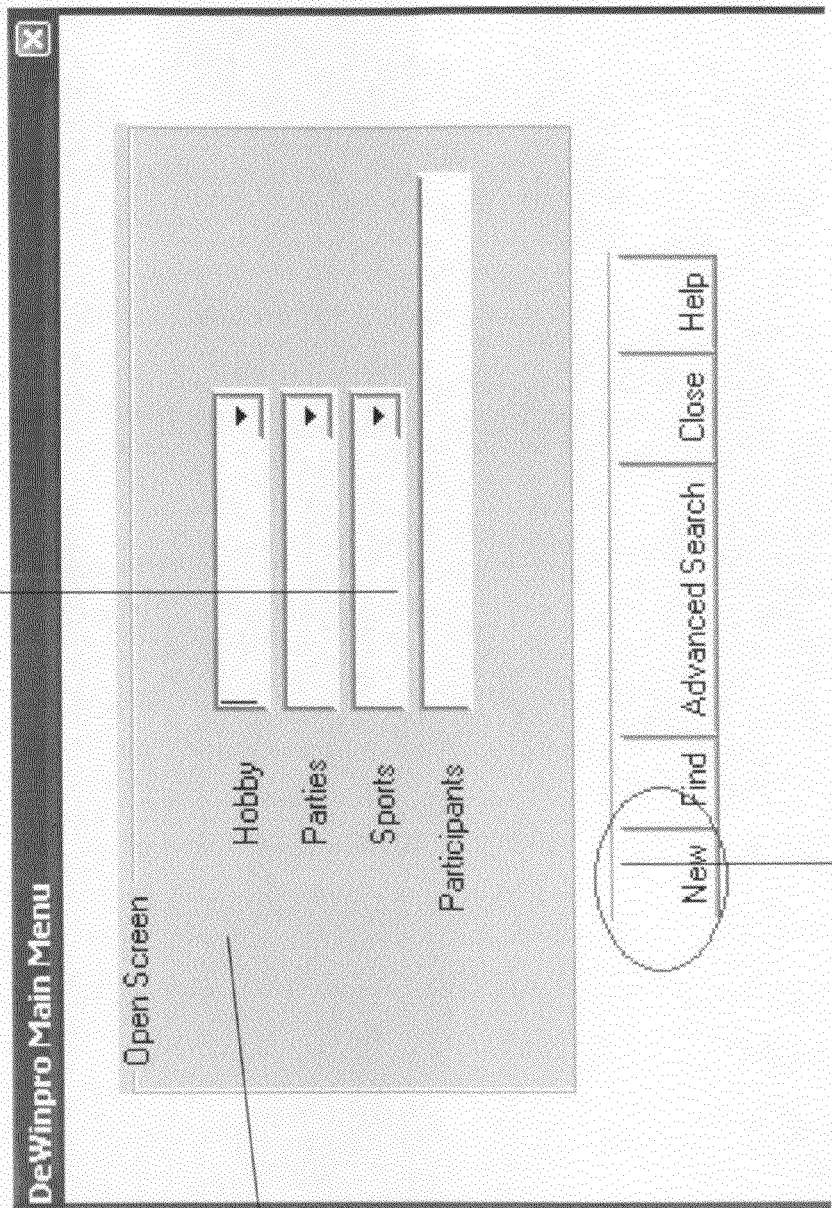
FIG. 8b illustrates a second opening screen for a second customized multimedia plug-in application, wherein several dynamically created fields and tool buttons specific to this customized multimedia plug-in application are shown.

Second, the application open screen 82, as shown in FIGS. 8 and 8a, has basic query fields for searching entities. Once a user has selected an available application from the login screen of FIG. 7, which selected application then launches and displays an application open screen 82. Comprised within the application open screen 82 are previously customized application data fields 83 and standard tool buttons 84. FIG. 8 illustrates an embodiment of an application open screen 82 for customized for medical use of the subject invention. FIG. 8a illustrates an embodiment of an application open screen 82 for customized for personal use of the subject invention. As shown in FIGS. 8 and 8a, the customized application data fields 83 allow a user to select a given entity by drop down menu of several identifying fields. In addition, standard tool buttons 84 allow a user to open navigate to the screen to open a new entity using the "New" button 85 or navigate to the detailed search screen (shown in FIG. 9) using the "Advanced Search" button 86.

Third, the detail search screen 90, as shown as shown in FIG. 9, has additional customized query fields for searching entities. A typical feature of these customized plug-in applications is the ability to search a multimedia system database for entities related to the specific multimedia plug-in application. FIG. 9 illustrates an embodiment of a customized multimedia plug-in application detail search screen 90, wherein customized search data fields 91 are selected to search the database for appropriate matching entities. FIG. 9 further illustrates an embodiment of an output format window 92 and a listing of customized output formats 93 that users may select.

Fourth, the searched result screen 94, as shown in FIG. 9a, shows all the matched entities in a table with customized columns. Once an output format 93 has been selected the results of the search query are displayed in a search results screen 94, illustrated in FIG. 9a. In one embodiment of the subject invention, the search results screen 94 displays columns in which the search query results are organized and dynamically generated by XML files comprising data fields for the customized multimedia plug-in application being used.

Figure 10A:
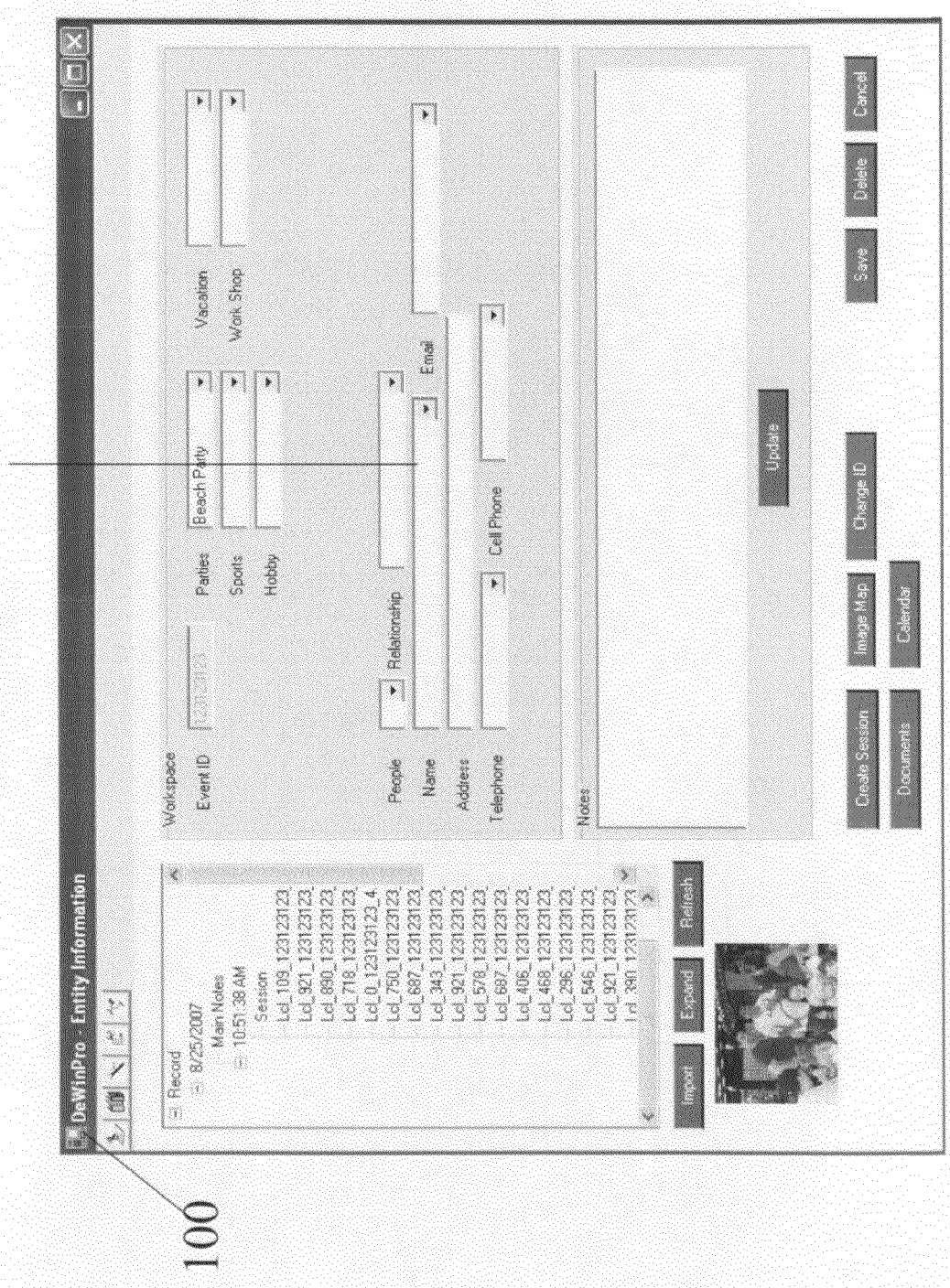
FIG. 10a illustrates a second workspace screen for a specific customized multimedia plug-in application, wherein all the fields for data entry are dynamically generated specific to the required fields of this customized multimedia plug-in application.

Fifth, the demographics data entry form or workspace window 100, as shown in FIGS. 10 and 10a, has fields for entering demographic information of an entity. FIG. 10 illustrates an embodiment of a workspace window 100 for a multimedia plug-in application customized for medical use. FIG. 10a illustrates an embodiment of a workspace window 100 for a multimedia plug-in application customized for personal use. As in previous windows containing data fields, all the workspace data fields 101 illustrated herein are dynamically generated from XML data files. Further, each data field 101 is associated with a corresponding database field in a demographic table in the database.

Figure 11:
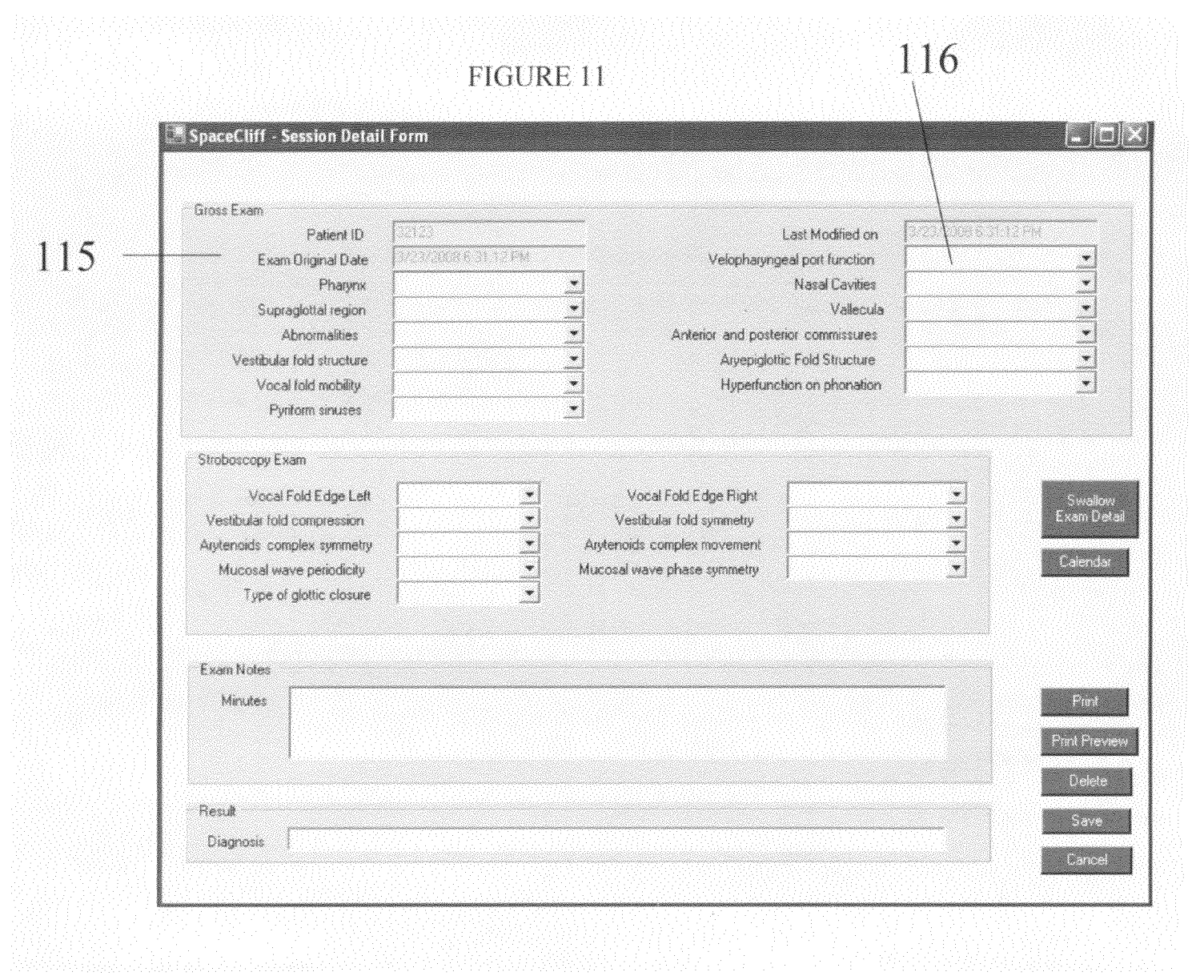
Figure 11A:
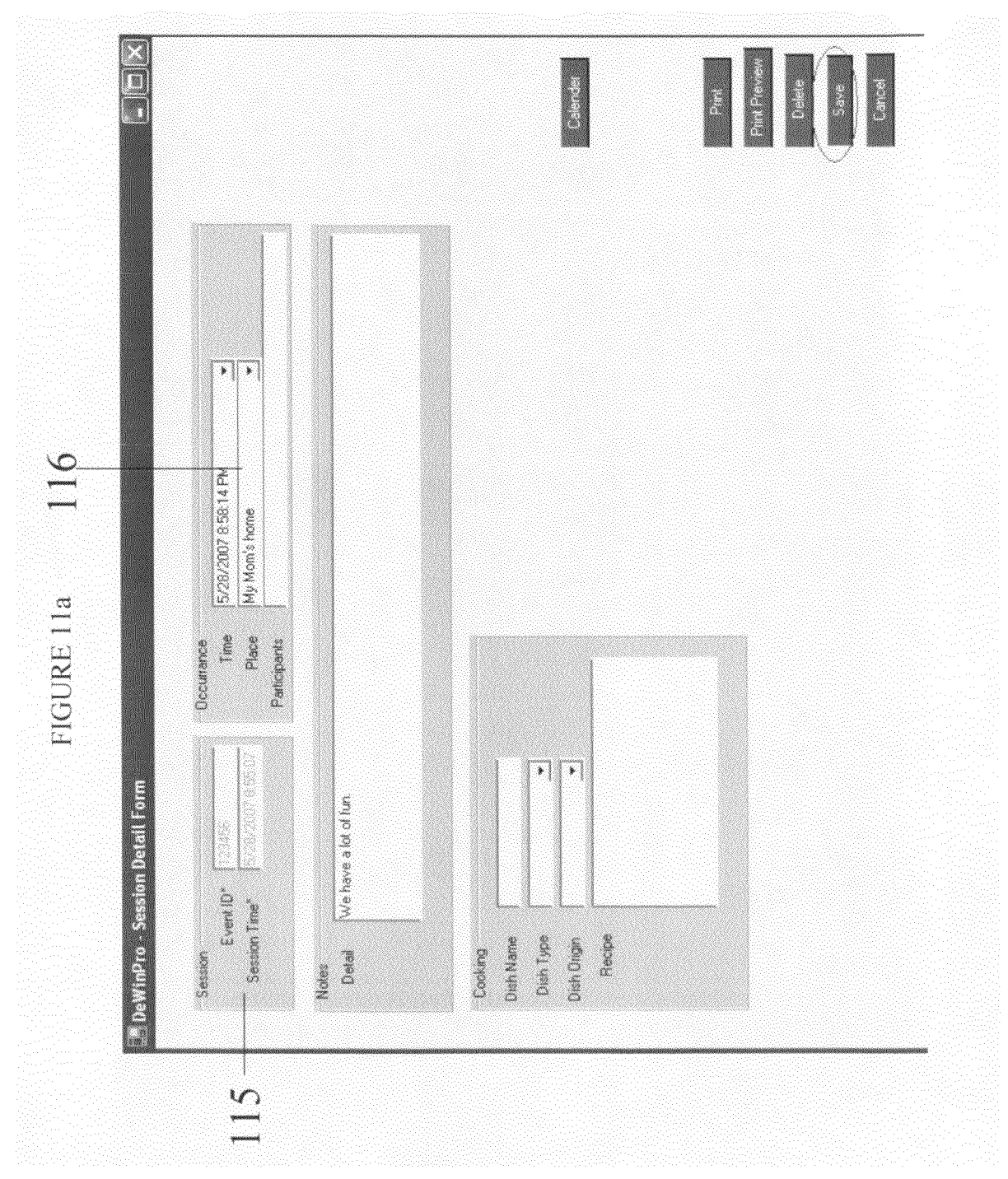
Figure 15:
FIG. 15 illustrates a thumbnail display of various captured multimedia session files, wherein all the displayed files are specific to a customized multimedia plug-in application.
Figure 23:
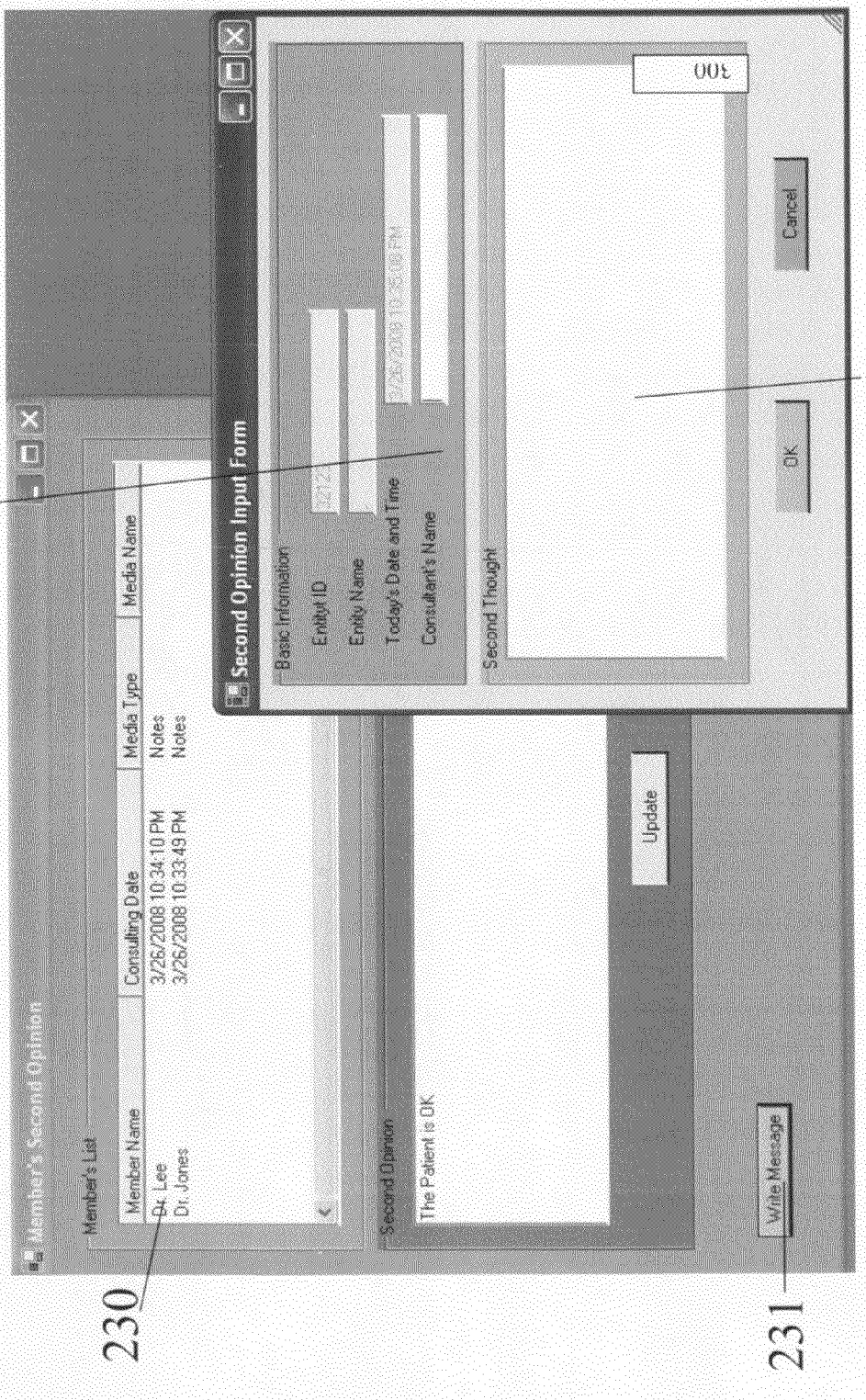
FIG. 23 illustrates a customized bulletin screen, used for a customized multimedia plug-in application. This bulletin screen allows for multiple users to share information and record written and multimedia files.

Workspace window 100 allows a user create a new session for an existing entity using the "New Session" button 102, update the information for a given entity using the "Update" button 103, or select the "Image Map" button 104 for opening the image map of a given entity as shown in FIG. 15. On the left side of the workspace window 100, there is a group box 105 that holds the navigation tree. This "Record" tree 106 summarizes a given entity's sessions and multimedia recordings. For every Record tree 106, there are "Date" nodes 107, which represent the days when the sessions occurred. Under each Date node, there is the "Main Notes" node 108, which records notes about the session. The Notes content can be entered in the "Notes" field 109 on the right side of the window with the "Main Notes" node selected. Under the "Dates" Node, there is the "Time" node 110 that represents the session time. Under each "Time" node, there is the "Session" node 111. By clicking on it, a session screen window 115 as shown in FIGS. 11 and 11a will appear. This session screen window 115 records detailed information about the session. Under each "Time" node 110, there are the image and video file nodes 112. In one embodiment of the subject application, images are saved JPEG format and videos are saved in AVI format. These files are the images and videos recorded and saved during the session. Each image and video node 112 is associated with a note that describes the findings within that media. The Notes content can be entered in the "Notes" field 109 on the right side of the window with the image or video node selected. Click the "Update" button 103 to save the note content. A new entity can be created by clicking on the "Save" button 113. There are two ways a user can replay the multimedia recordings (images and videos). First, the user can select the image or video node 112 in the "Record" tree 106, a thumbnail image will appear at the left bottom corner of the form. Right clicking on the thumbnail and selecting the "Display" option will cause the image or video window to appear. Second, the user can select the image map button 104 for opening the image map of a give entity as shown in FIG. 15. A user may also engage the bulletin messaging board screen 230 to share notes and multimedia files with other users of the customized plug-in application, as shown in FIG. 23, by selecting the "Display Second Opinion" icon 114 on the icon bar.

Sixth, the event session detail data entry form or session screen window 115, as shown in FIGS. 11 and 11a, has fields for entering the detail information about a session related to an entity. FIGS. 11 and 11a illustrate an embodiment of session data fields 116 in a session screen window 115, wherein each session data field 116 is mapped to a corresponding database field in a session table, specific to the customized multimedia plug-in application being used. Each session data field 116 has a list of drop down options which can be preprogrammed or listed from the previous entries.

Figure 12:
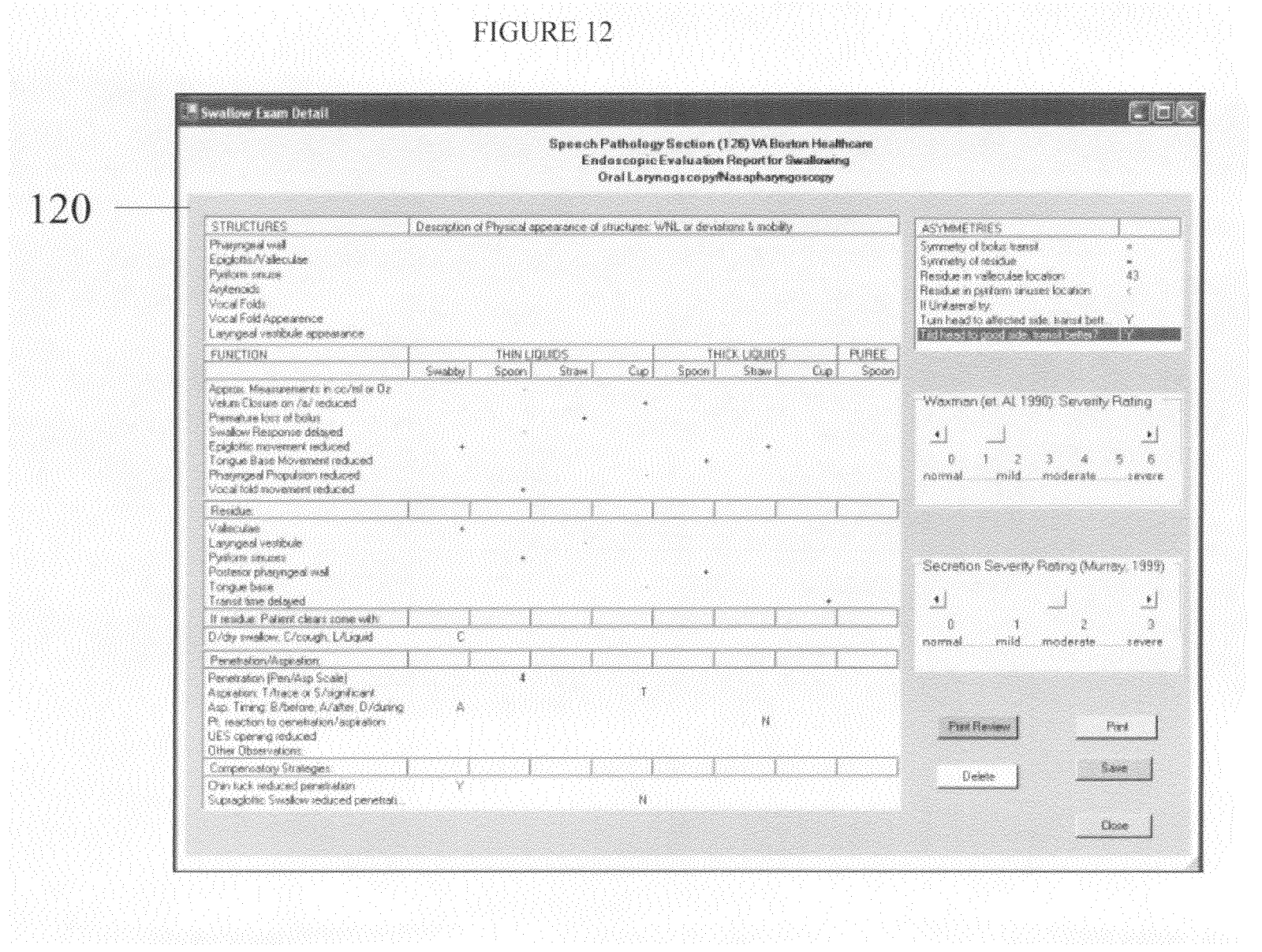

FIG. 12 illustrates an embodiment of a display screen window 120, selected and specifically developed for a multimedia application software plug-in customized for medical use.

Figure 14:
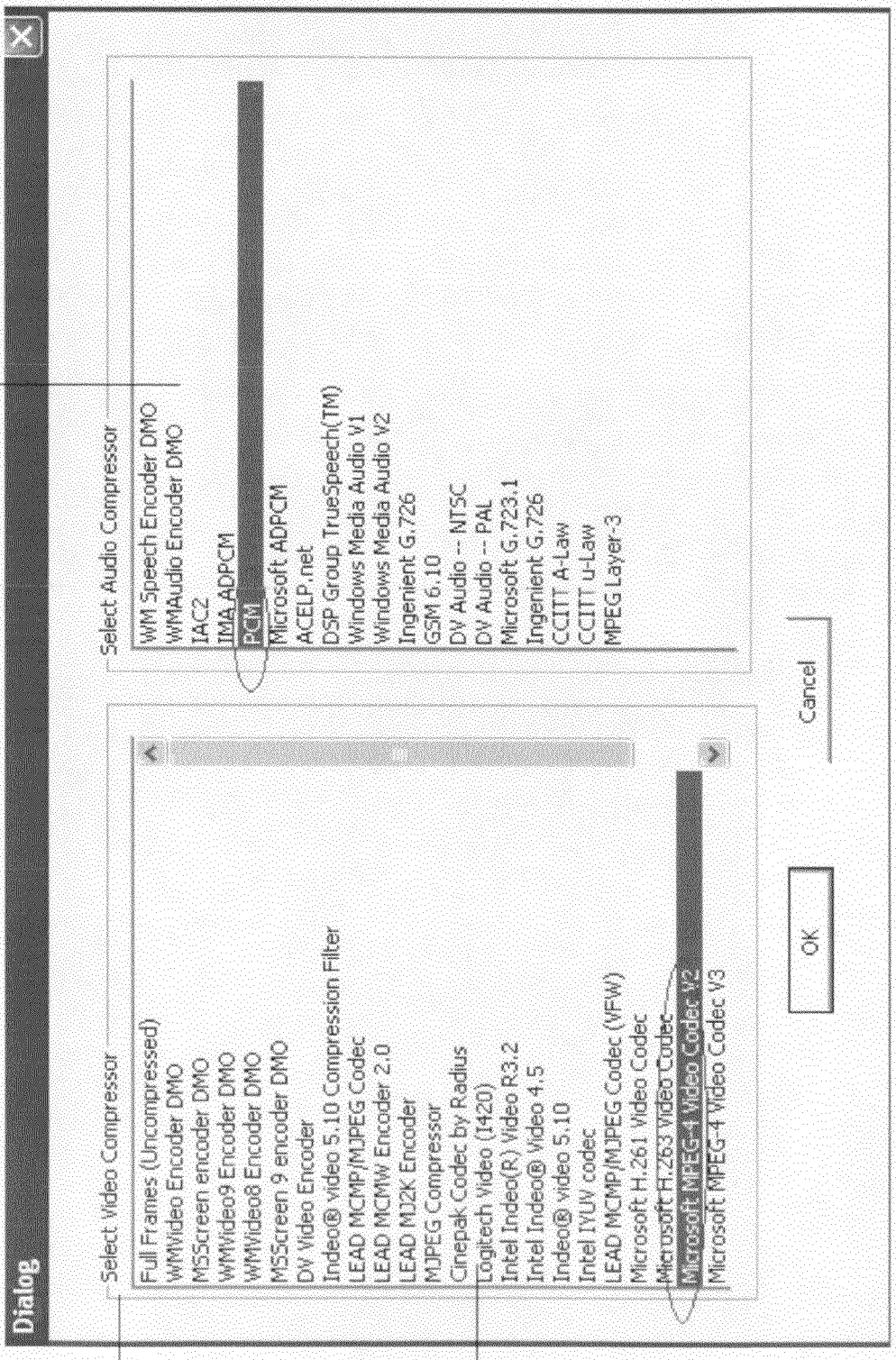
FIG. 14 illustrates a second live video capturing parameters selection screen, wherein a user selects the digital file format to save the live video capturing session.

FIG. 13 illustrates an embodiment of a live video capture screen 130 displaying the image being captured by the camera. Once a multimedia file is ready to be saved, the user may select the appropriate video and audio codex (formats) from a video codex selection list 141 and an audio codex selection list 142 displayed in the codex selection dialog window 140 as illustrated in FIG. 14. This step determines what type of data compression technique will be utilized when saving the video file. The user can select the Start and Stop buttons on the Live Window to capture a video file from the USB-2 port connected camera.

FIG. 15 illustrates an embodiment of an image map 150 comprised of thumbnails representing captured multimedia files, wherein each file is specific to a particular customized multimedia plug-in application.

Figure 16:
FIG. 16 illustrates a display of an image processing screen with an image processing tool bar comprised of various image manipulation buttons.
Figure 17:
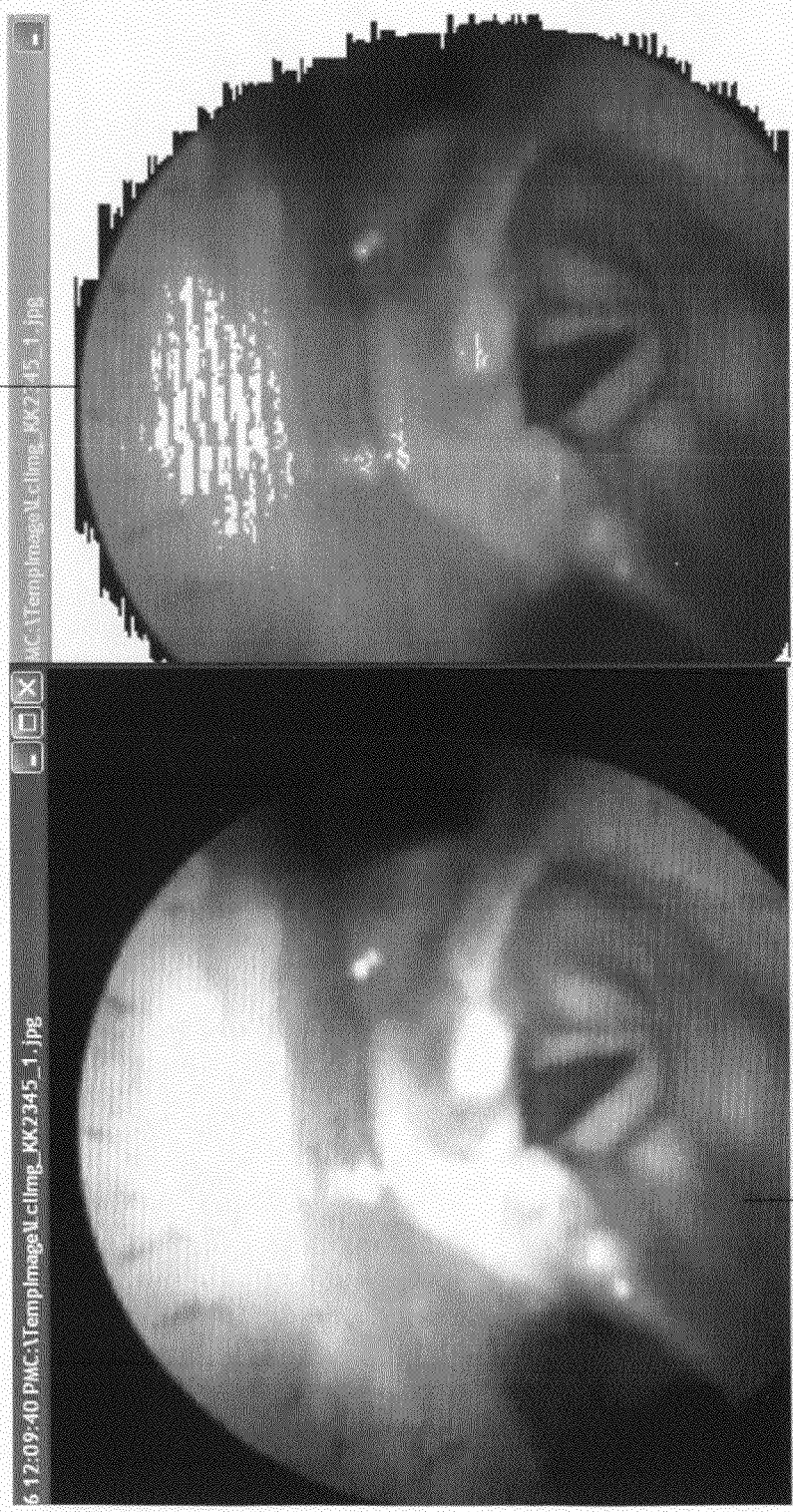
FIG. 17 illustrates the use of multiple image display windows on one display screen used for comparison purposes between images.

FIGS. 16 and 17 illustrate an embodiment of additional screens particularly developed for a given customized multimedia plug-in application. FIG. 16 illustrates an image processing screen 160 comprising a selection of user-developer selected image manipulation buttons 161. FIG. 17 illustrates the ability to compare an active image window 170 with an inactive image window 171 when comparison of like objects would be beneficial for the user.

FIG. 18 illustrates an embodiment of a customized session report 180 generated utilizing data from the XML files of the multimedia plug-in module in use.

Figure 19:
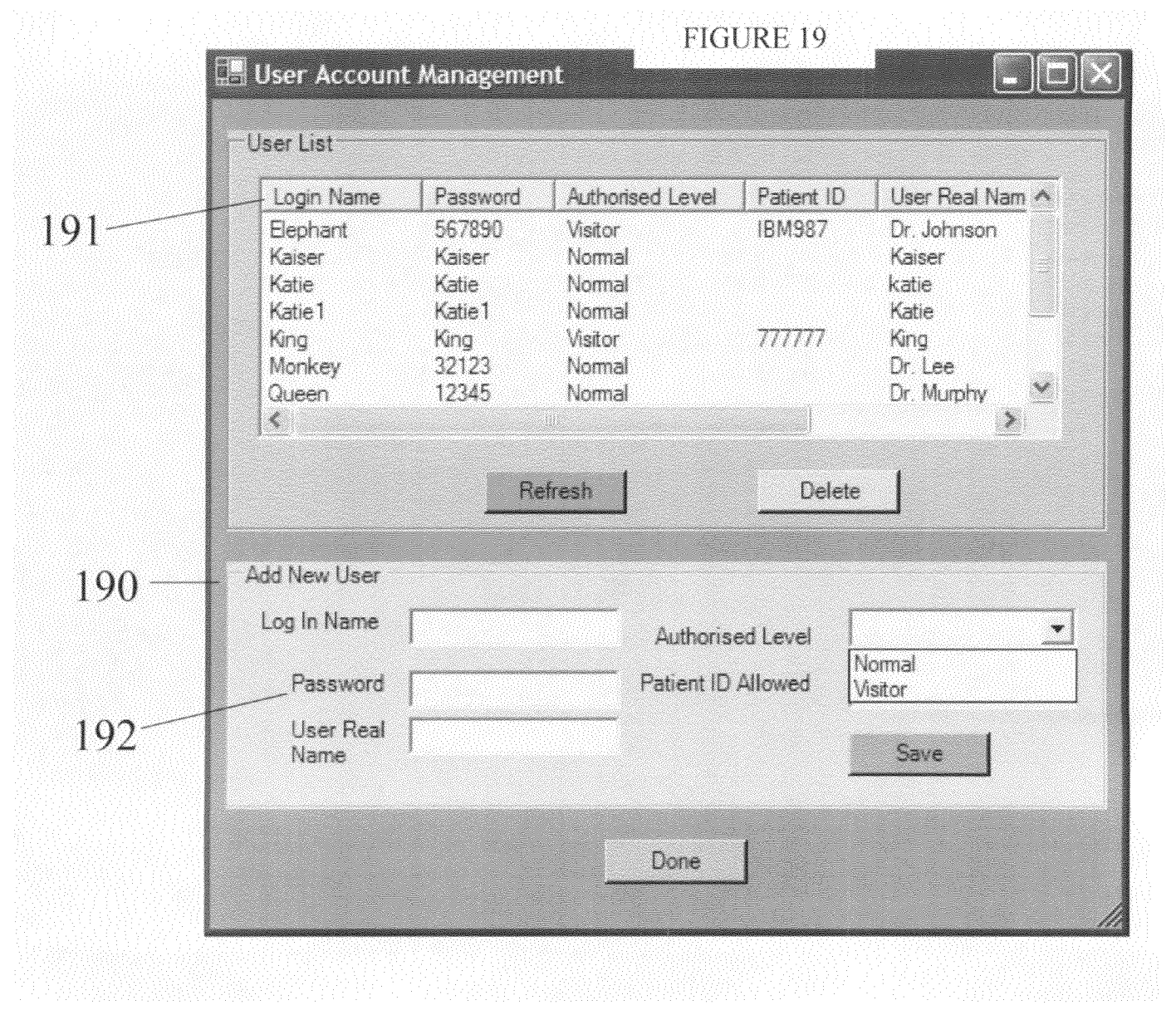
Figure 20:
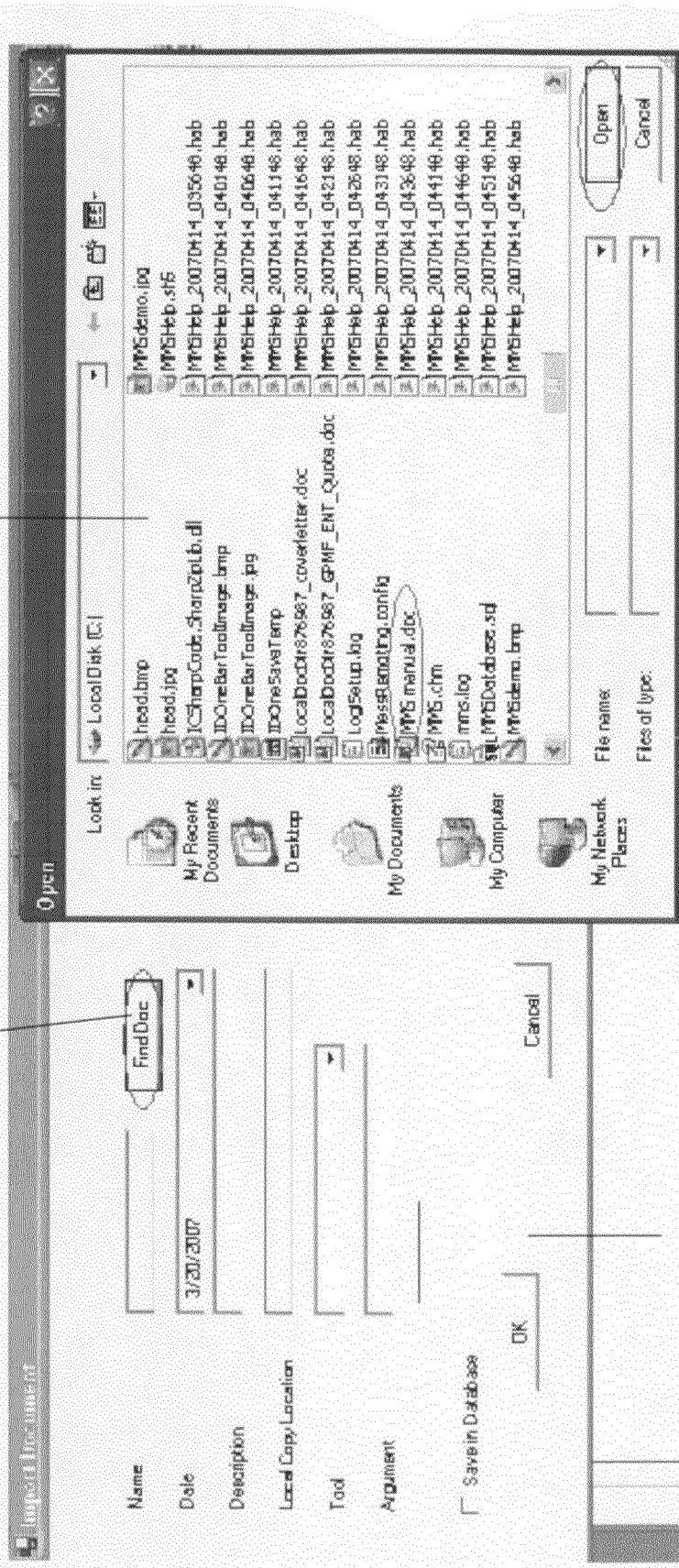
FIG. 20 illustrates windows used during the importing of third-party documents into a multimedia application workspace. The window to the left displays the import document setup screen, while the window to the right displays the files a user may select from in order to select a file.
Figure 21:
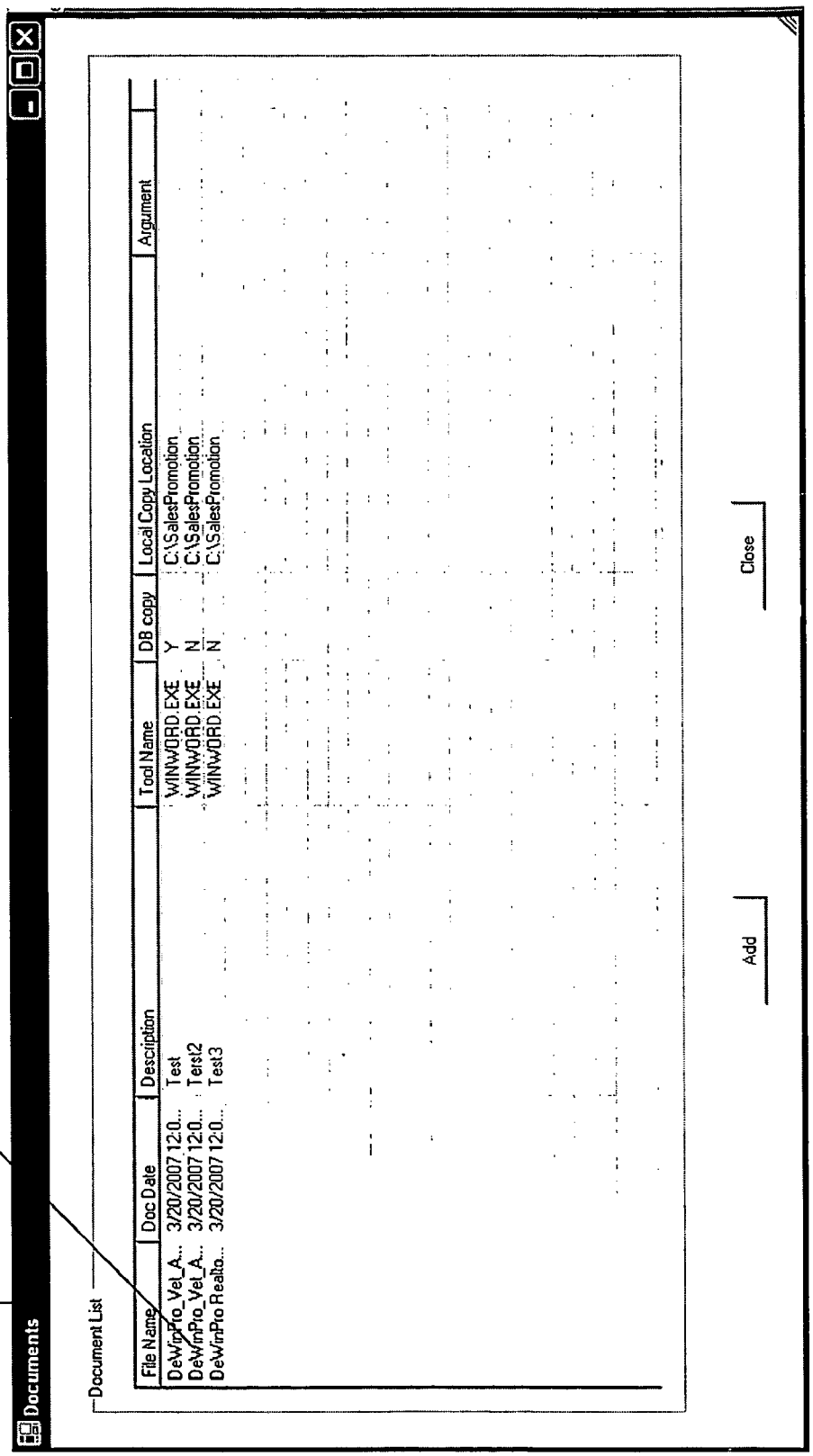
FIG. 21 illustrates a third party documents screen, wherein the documents displayed within the window may be launched.
Figure 22:
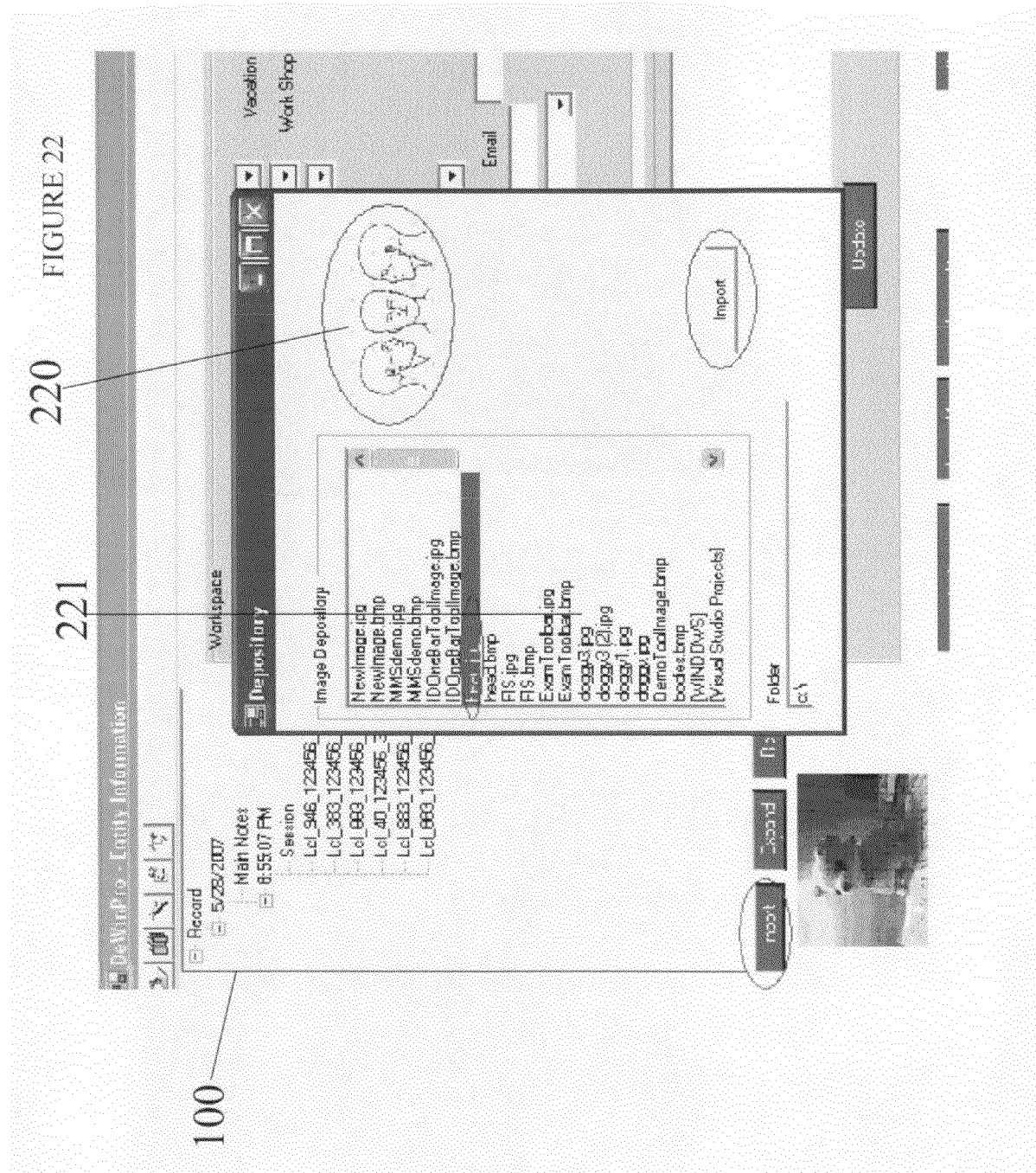
FIG. 22 illustrates an import image to workspace screen, wherein the smaller active window displays a list of files that may be imported into the workspace.

FIGS. 19, 20, 21, 22 and 23 illustrate additional embodiments available in a multimedia framework. FIG. 19 illustrates a user account management window 190, which displays a list of users 191 for a given customized multimedia plug-in application. This allows a user-manager to add and remove access to any given customized multimedia plug-in application for any user using the "Add New User" data fields 192. FIG. 20 illustrates two windows used in the importation of third party documents into the workspace. The left of FIG. 20 illustrates a document importation window 200 with appropriate data fields associated with third party document importation and a "find document" button 201 (functionally equivalent to a normal GUI "browse" button). The right window 200 of FIG. 20 illustrates a common open file dialog box 202, wherein a user may browse through a directory structure and select the file they wish to be imported to the entity's workspace. FIG. 21 illustrates a third party document display window 210, comprising a list of available third party documents 211 already imported into the system and available to launch within the customized multimedia plug-in application being used. FIG. 22 illustrates a set of windows associated with the importing of multimedia files into the workspace (and therefore workspace screen 100) for a given customized multimedia plug-in application. From a depository display window 220 a user may select image files 221 that the user wishes to import to the workspace of the multimedia plug-in application being used. FIG. 23 illustrates a bulletin board screen 230. This screen allows multiple users to share information about a given entity within the customized multimedia plug-in application being used. Every entity has a message board where different users can record messages regarding to the patient's condition. Users may select the "Write message" button 231, and the Second Opinion Input Form 232 will appear. Any text can be entered in the "Second Thought" text box 233.

Figure 24:
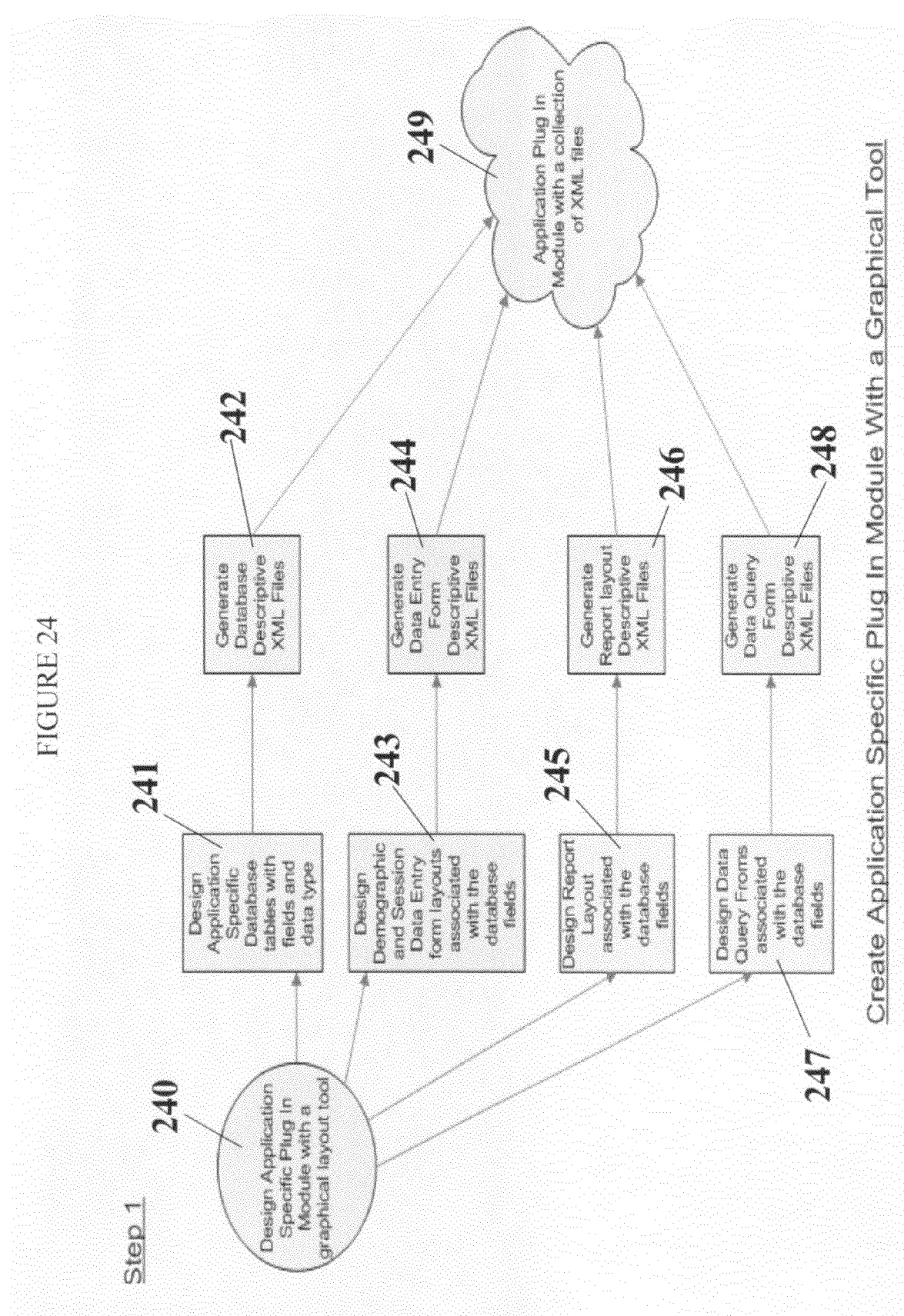
FIG. 24 illustrates the general steps necessary to develop a customized multimedia plug-in application.
Figure 30:
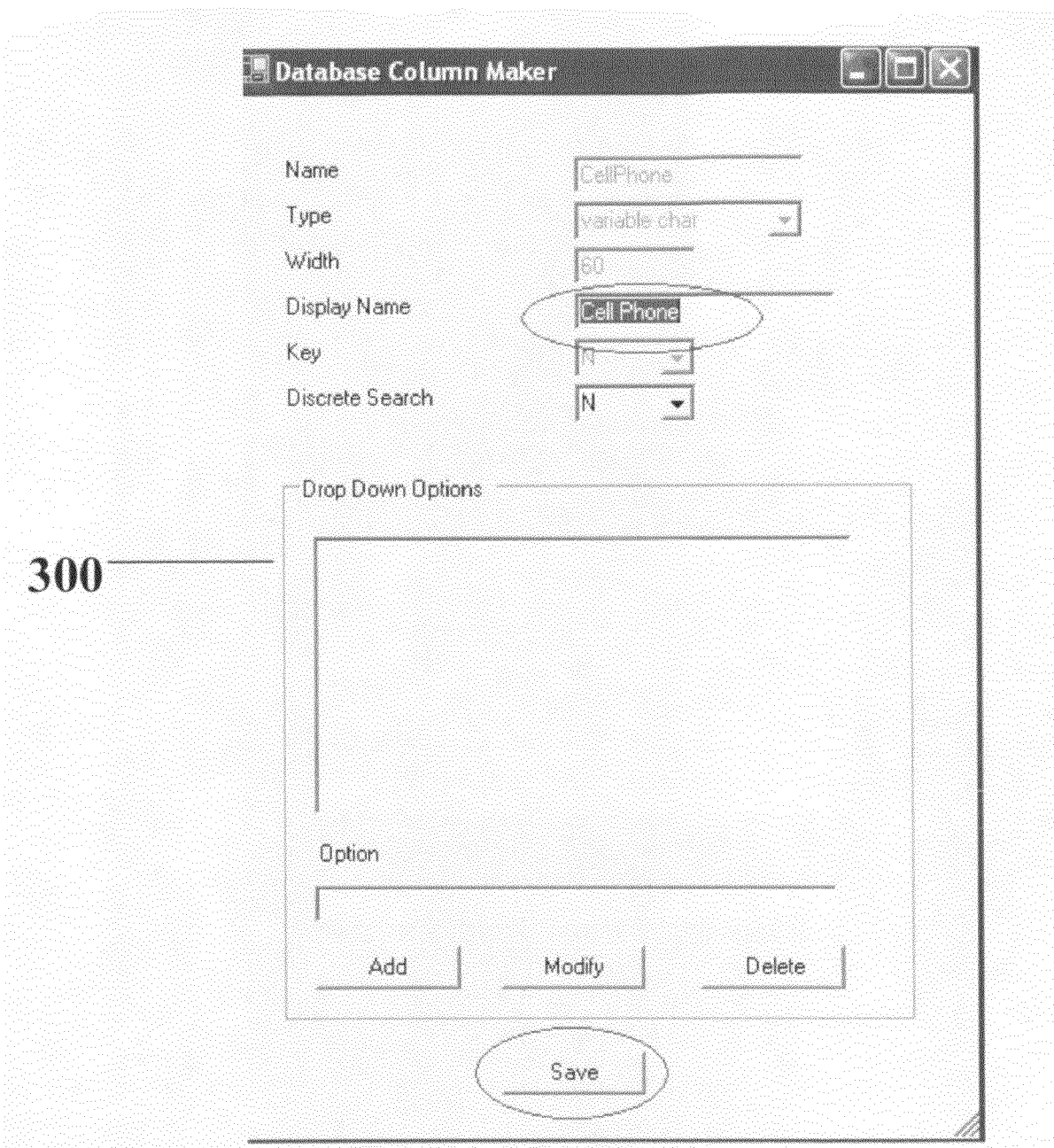
FIG. 30 illustrates an embodiment of the graphical user interface used to design the field properties of a database column.

FIG. 24 illustrates an embodiment of the steps used to develop a customized multimedia plug-in application (also referred to herein as a final application plug-in module). First, a user designs a specific plug-in module with a graphical layout tool 240. From this initial starting point the user may design four additional components. The user may then design application specific data tables with data fields and data types 241. An embodiment of the graphical user interface used to design the properties of a database is shown in FIG. 29. An embodiment of the graphical user interface used to design the field properties of a database column is shown in FIG. 30.

Figure 31A:
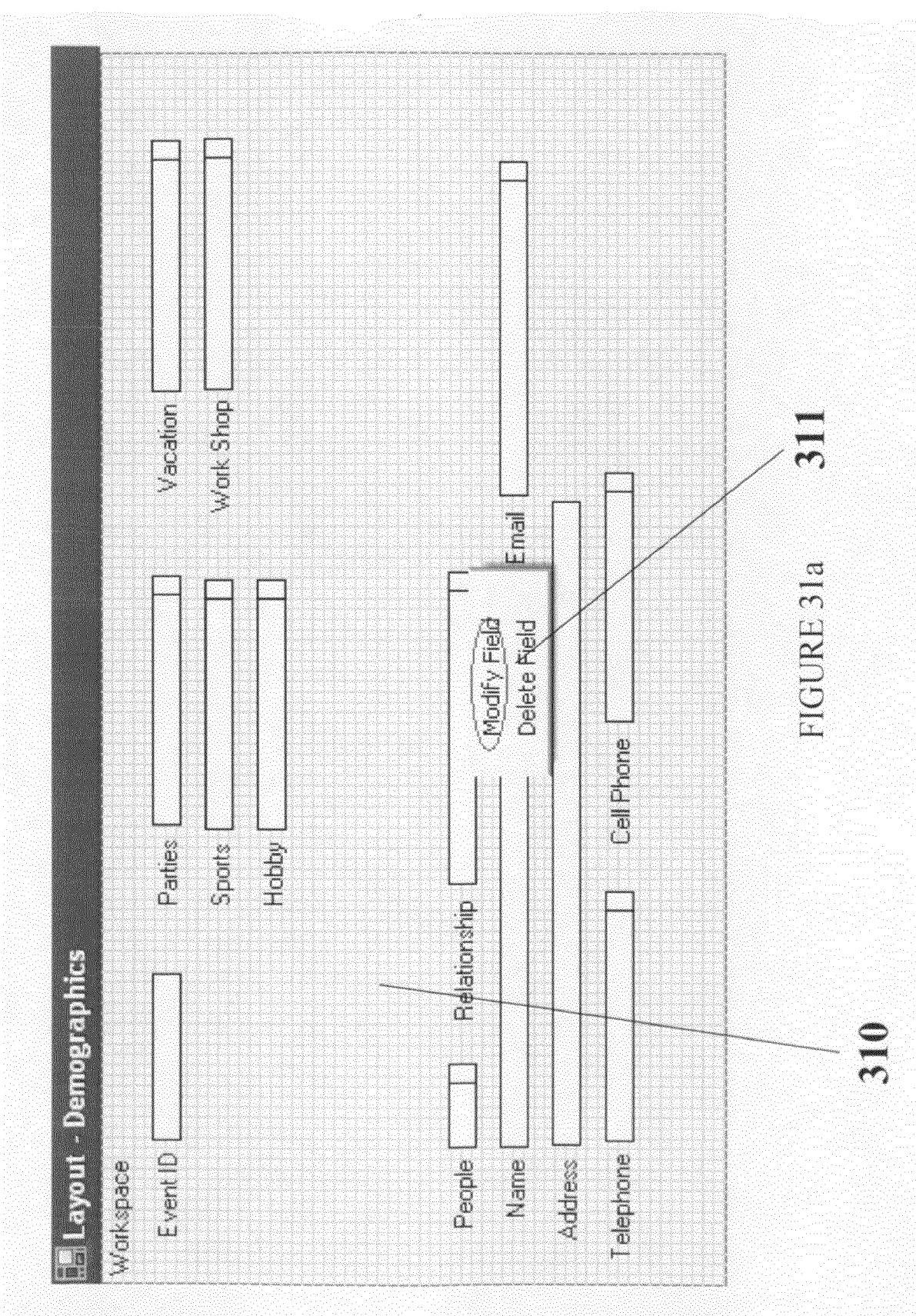
Figure 31B:
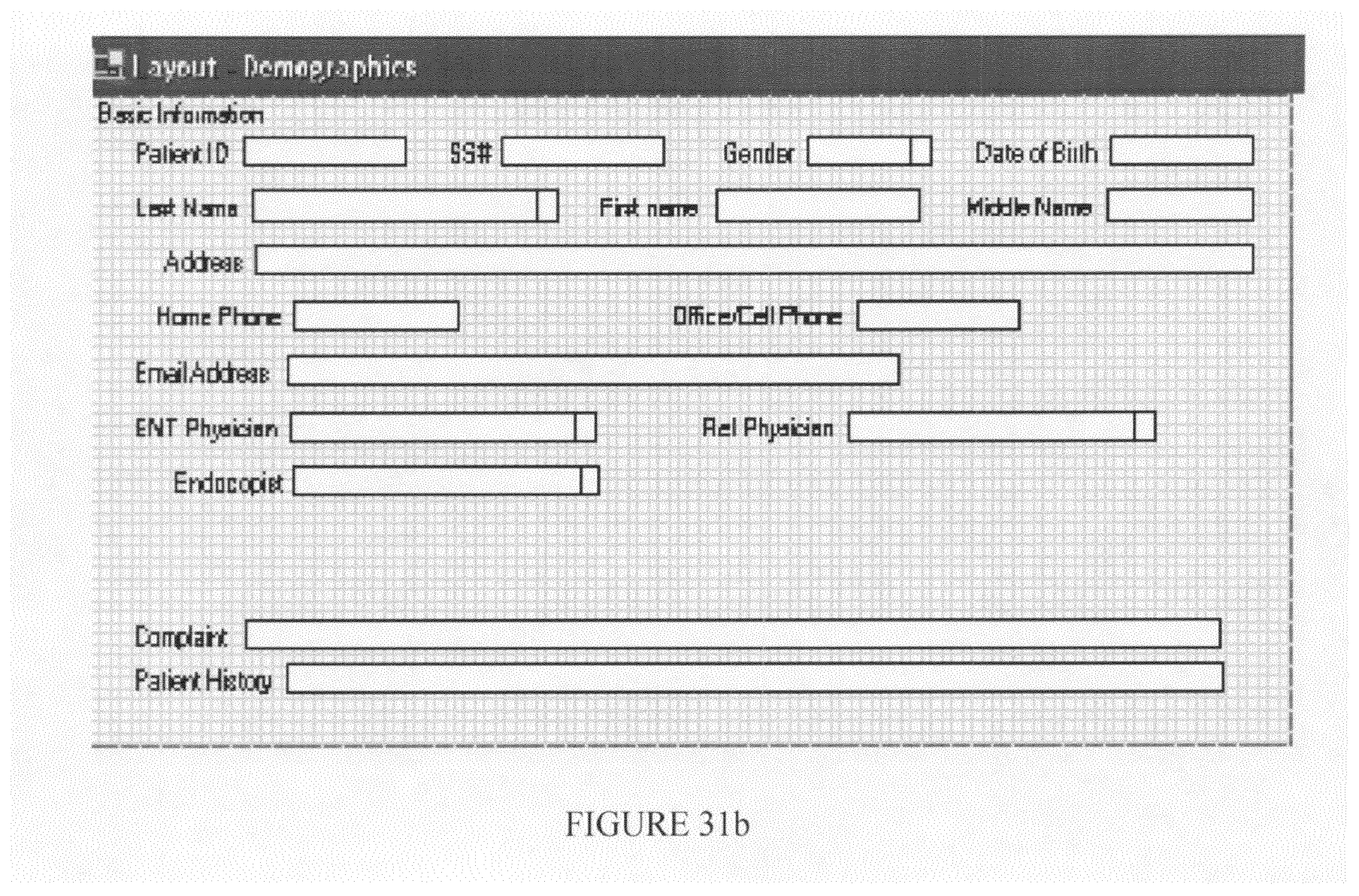
Figure 32A:
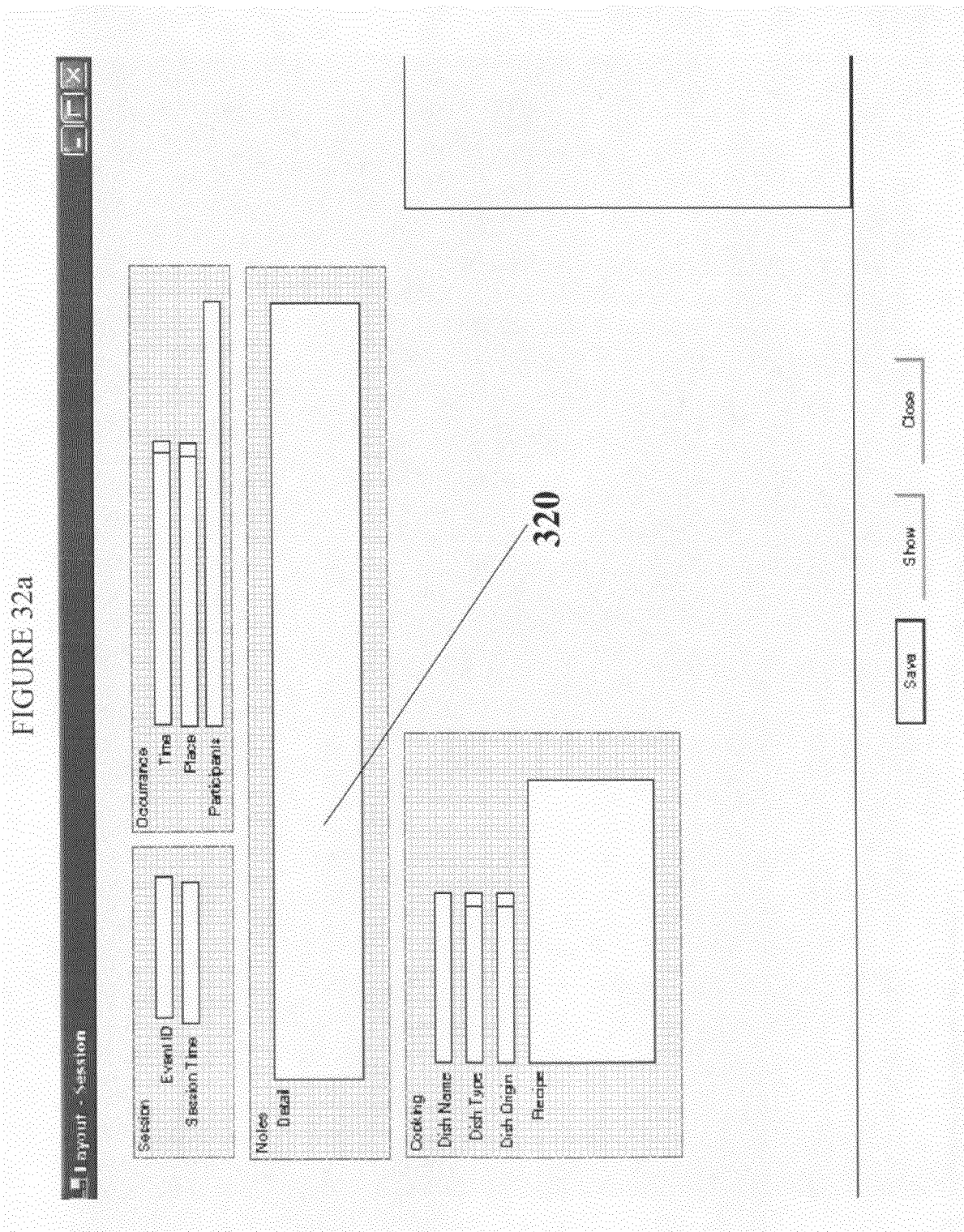
Figure 32B:
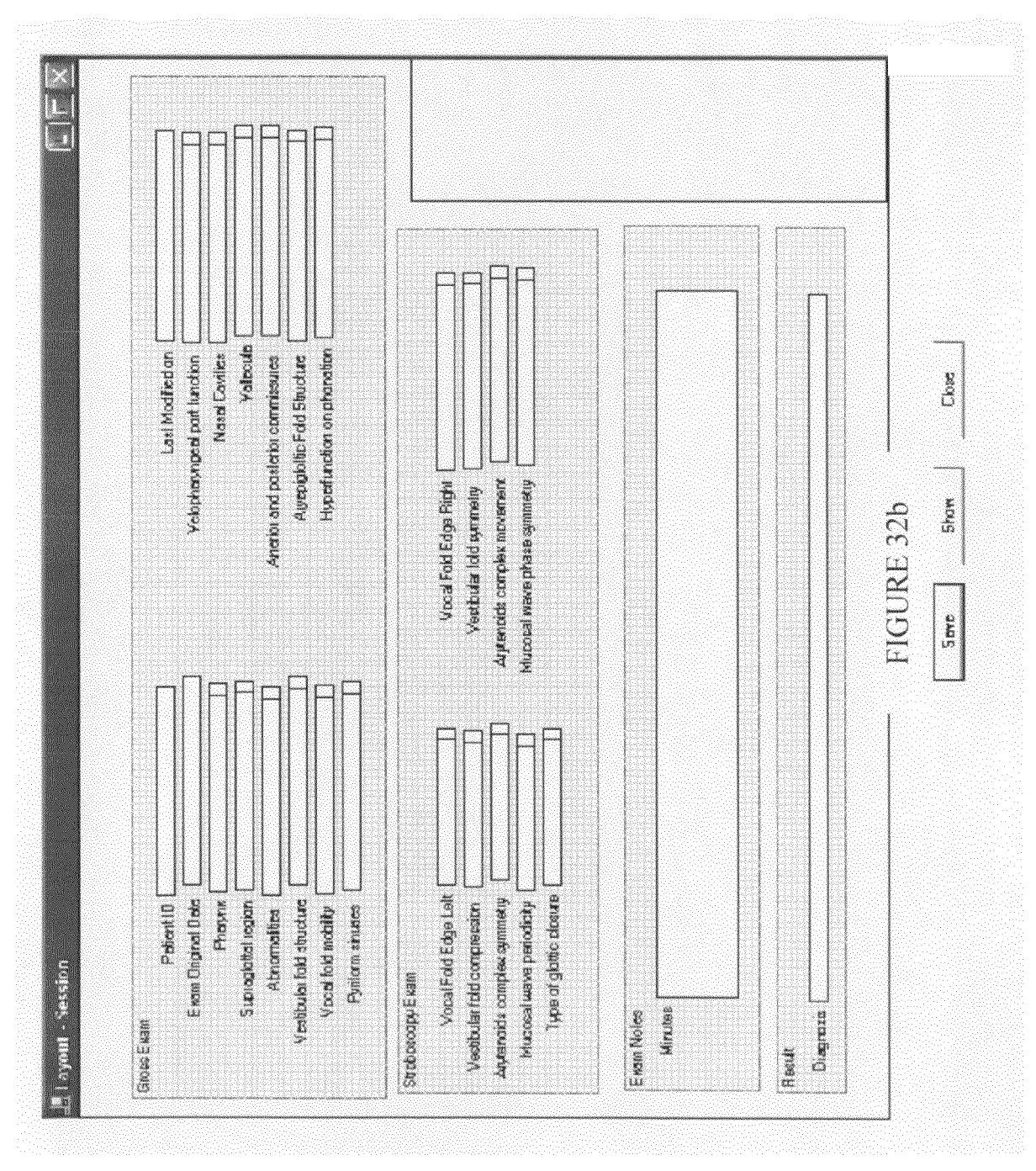
Figure 35:
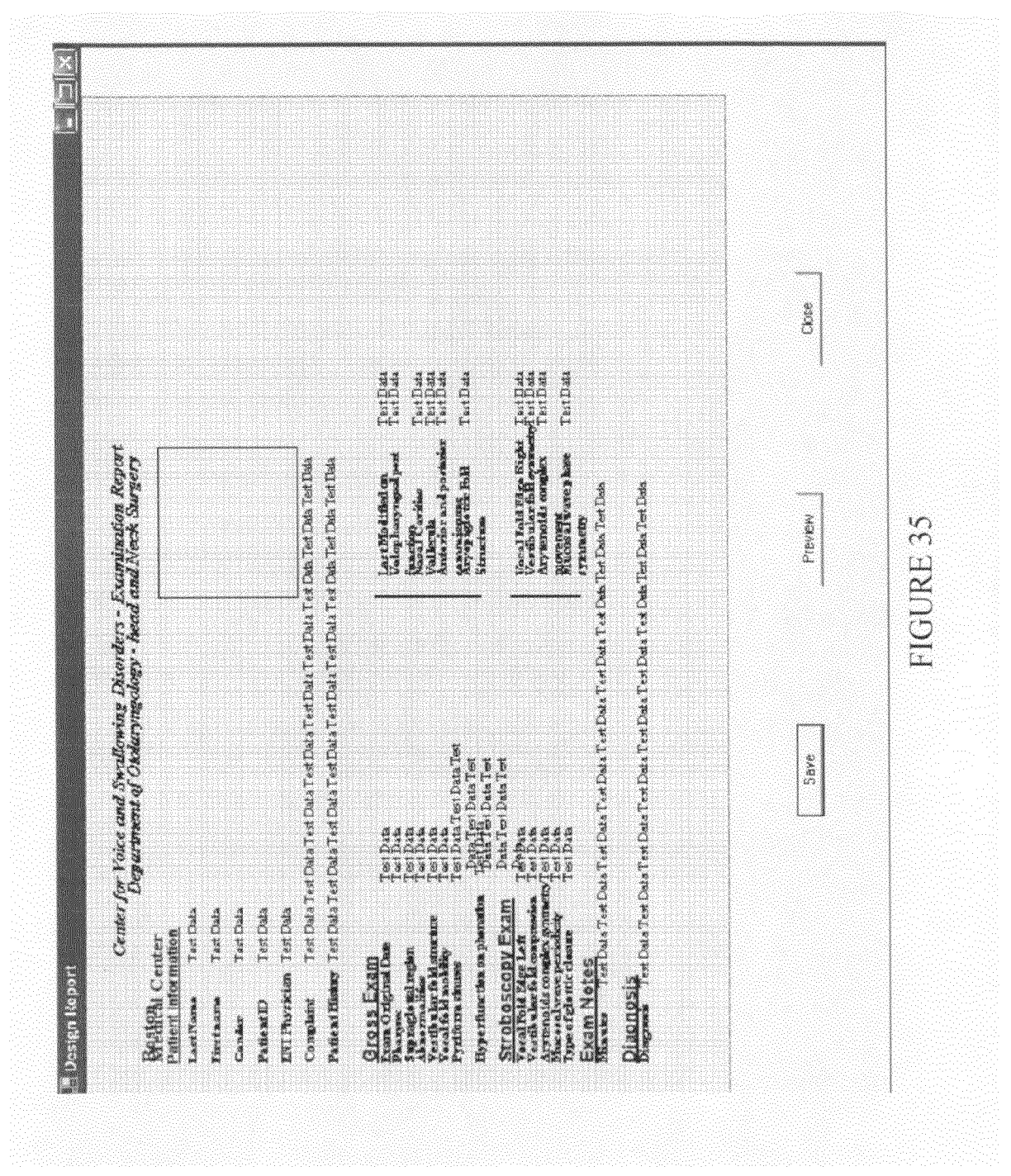
Figure 36:
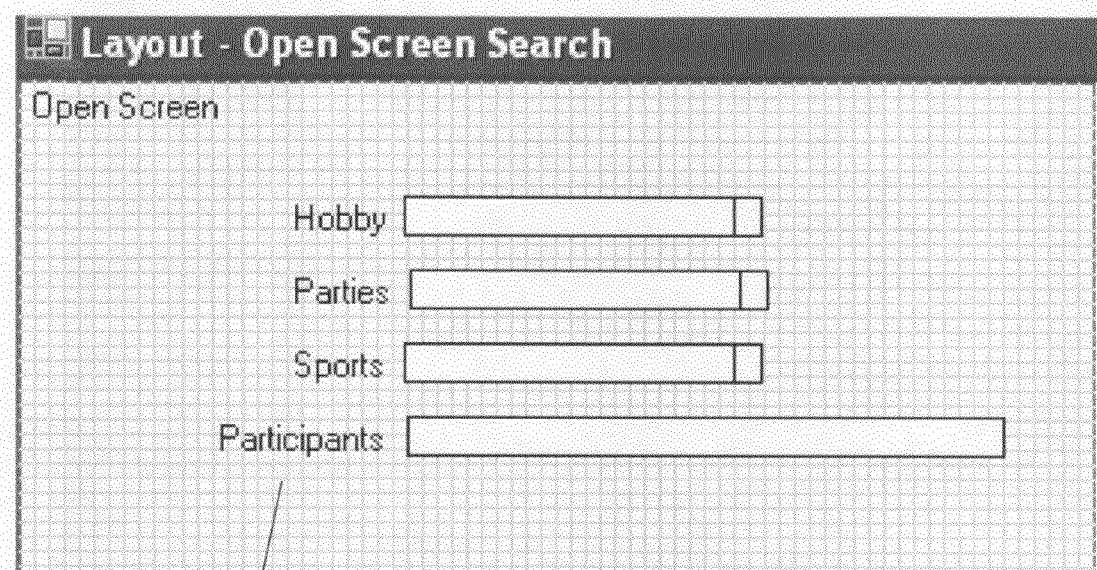
FIG. 36 illustrates an embodiment of the graphical user interface used to design a simple query form layout with the Plug-In Tool layout tool

Once these specific data tables 241 are designed, the program generates database specific XML files 242 for the final application plug-in module 249. The user may then design demographic and session data entry form layouts 243 associated with database fields. An embodiment of the graphical user interface used to design a demographic data entry form layout with the Plug-In Tool layout tool is shown in FIGS. 31a and 31b. An embodiment of the graphical user interface used to design a session data entry form layout with the Plug-In Tool layout tool is shown in FIGS. 32a and 32b. Once these form layouts 243 are designed, the program generates data entry form descriptive XML files 244 for the final application plug-in module 249. The user may then design a report layout 245 associated with the database fields. An embodiment of the graphical user interface used to design a report layout with the Plug-In Tool layout tool is shown in FIG. 35. Once these report layouts 245 are designed, the program generates report layout descriptive XML files 246 that are incorporated into the final application plug-in module 249. Finally, the user may design data query forms 247 associated with database fields. An embodiment of the graphical user interface used to design a simple query form layout with the Plug-In Tool layout tool is shown in FIG. 36. Once these data query forms 247 are designed, the program generates descriptive XML files 248 that are incorporated into the final and complete final application plug-in module 249.

Figure 25:
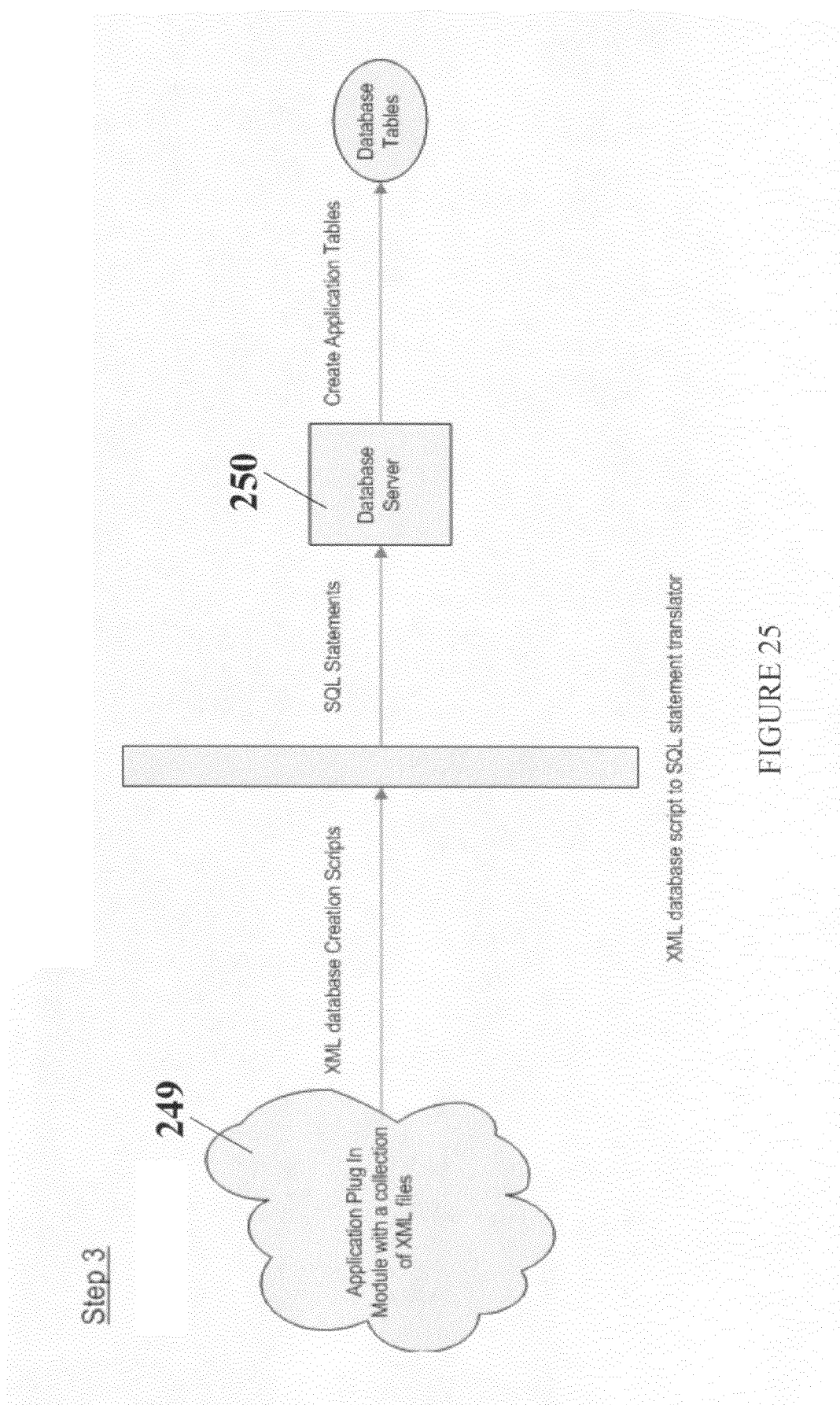
FIG. 25 illustrates the process of installing an application specific plug-in module on a designated user computer over a network, such as the Internet.

FIG. 25 illustrates an embodiment of installing an application specific plug-in module 249 on a designated user computer over a network, such as the Internet. As shown in FIG. 25, computer 250 is connected to the Internet and functions as a database server from which end-users may download the application specific plug-in module 249 whose XML script is translated into structured query language (SQL) statements to generate the customized database tables.

In one embodiment of the subject application the method to save field layout information in a data entry form into an XML file is described as follows:

The first step to save field layout information in a data entry form into an XML file is to define a class that describes an I/O field such as:

```
[Serializable( )]
public class FieldInfo
{
    public string szColName = "";
    public string szDisplayName = "";
    public string szControlType = "";
    public Location pLoc;
    public string szData;
    .
    .
    public FieldInfo( )
    {
    }
}
```

The second step to save field layout information in a data entry form into an XML file is to define a Field List class which holds the the I/O Field Objects such as:

```
[Serializable( )]
public class FieldInfoList
{
    public List<FieldInfo> pInfo;
    public FieldInfoList( )
    {
    }
}
```

The third step to save field layout information in a data entry form into an XML file is to create the instantiated I/O Field Objects which map into the fields in a data entry form and add them to an instantiated Field List Object. The fourth step to save field layout information in a data entry form into an XML file is to serialize the Field List Object into an XML stream and save it in a file.

In one embodiment of the subject application the method to generate SQL statements dynamically from the field data of a data entry form is described as follows:

The first step to generate SQL statements dynamically from the field data of a data entry form is to create the instantiated I/O Field Objects which map into the fields in a data entry form and add them to an instantiated Field List Object. At this time, the field data is already part of the I/O Field Object.

The second step to generate SQL statements dynamically from the field data of a data entry form is to iterate the Field List Object to extract the I/O Field objects. In each iteration, the information in an I/O Field Object item will be appended to an established SQL statement as part of the query. For Example:
    String szSQLStatement="Insert into TableA (pFieldInfo1.szColName, pFieldInfo2.szColName . . . ) values (pFieldInfo1.szData, pFieldInfo2.szData . . . );"
    Where pFieldInfo1 and pFieldInfo2 are the instantiated I/O Field Objects representing each I/O field in the data entry form.

The dynamic SQL Update and Select statements are created with the similar method as the dynamic SQL Create statement.

Figure 26:
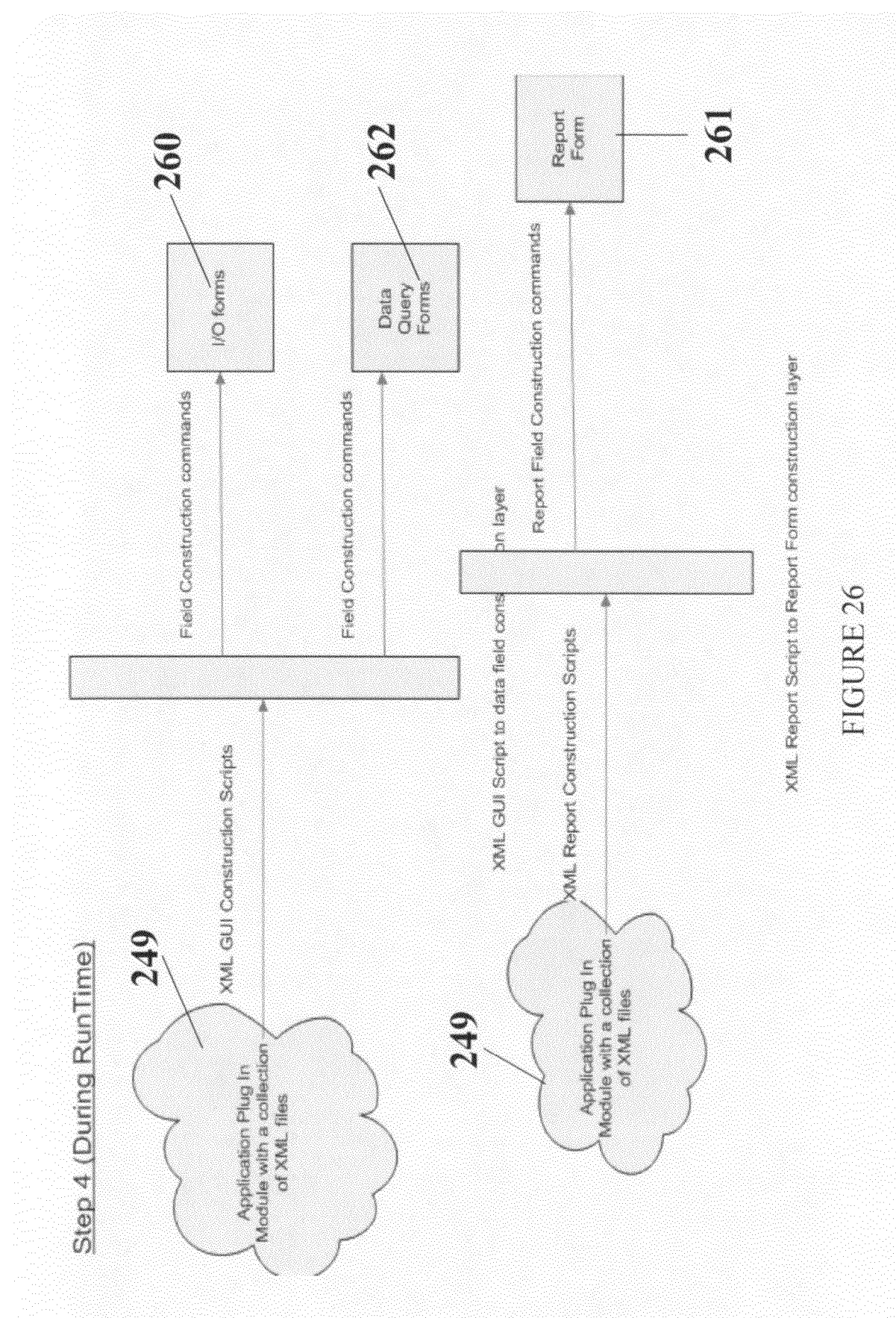
FIG. 26 illustrates the process that during runtime, the I/O fields of the data entry form, report form, query form, and query result form are dynamically generated based on the field information from the XML files.

FIG. 26 illustrates the process that during runtime, the input/output fields 260 of the data entry form, report form 261, query form 262, and query result form are dynamically generated based on the field information from the XML files.

Figure 27:
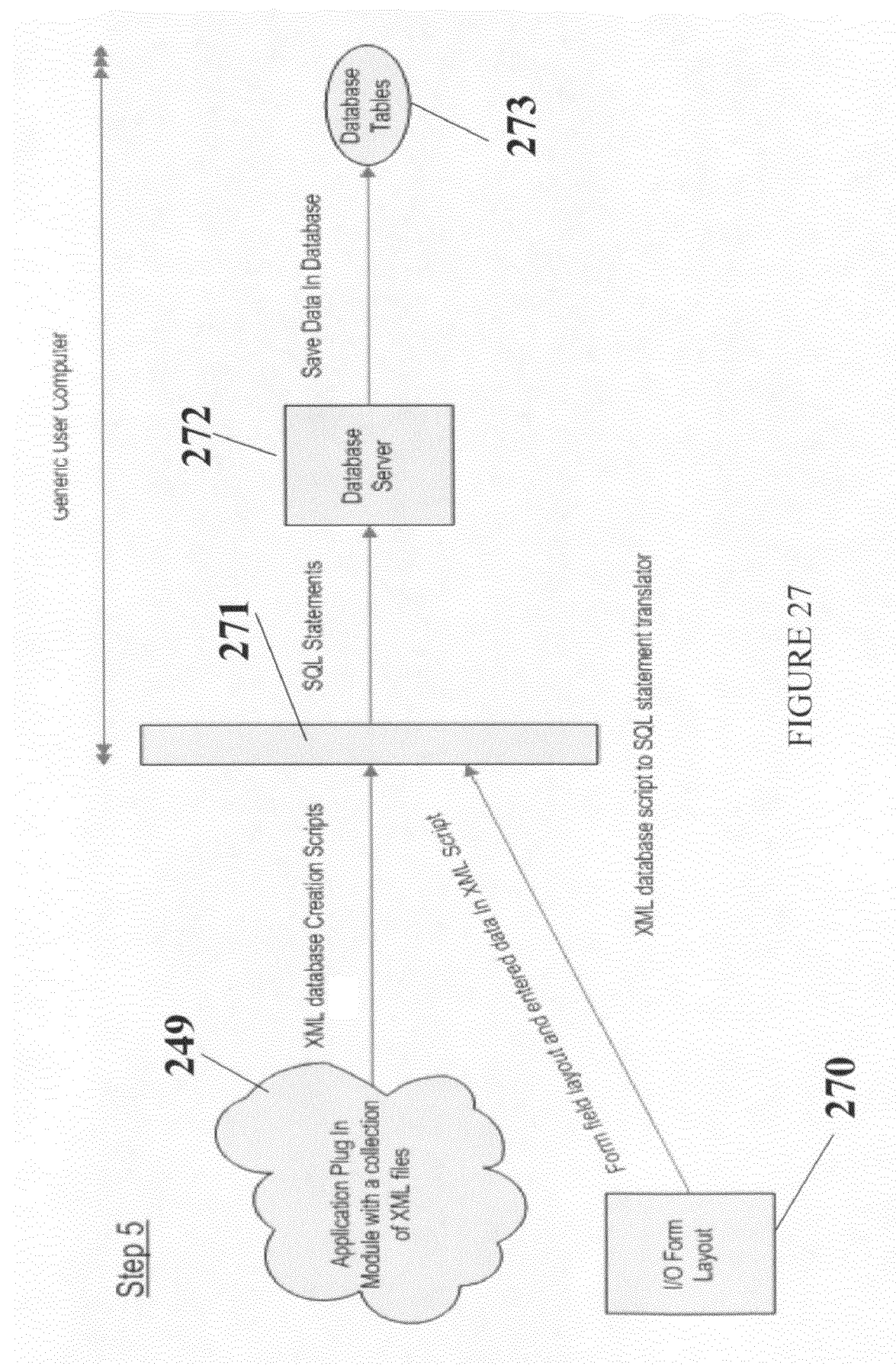
FIG. 27 illustrates the process in which application specific plug-in module data is saved to an application specific database table.

FIG. 27 illustrates the process in which application specific plug-in module data is saved to an application specific database table. The application specific plug-in module 249 and the data in I/O form fields 270 are passed to a translation layer that converts XML database scripts, XML form layout scripts, and the form data into SQL statements 271. The SQL statements are then passed to a database server 272 to be saved and stored in a database table 273.

Figure 28:
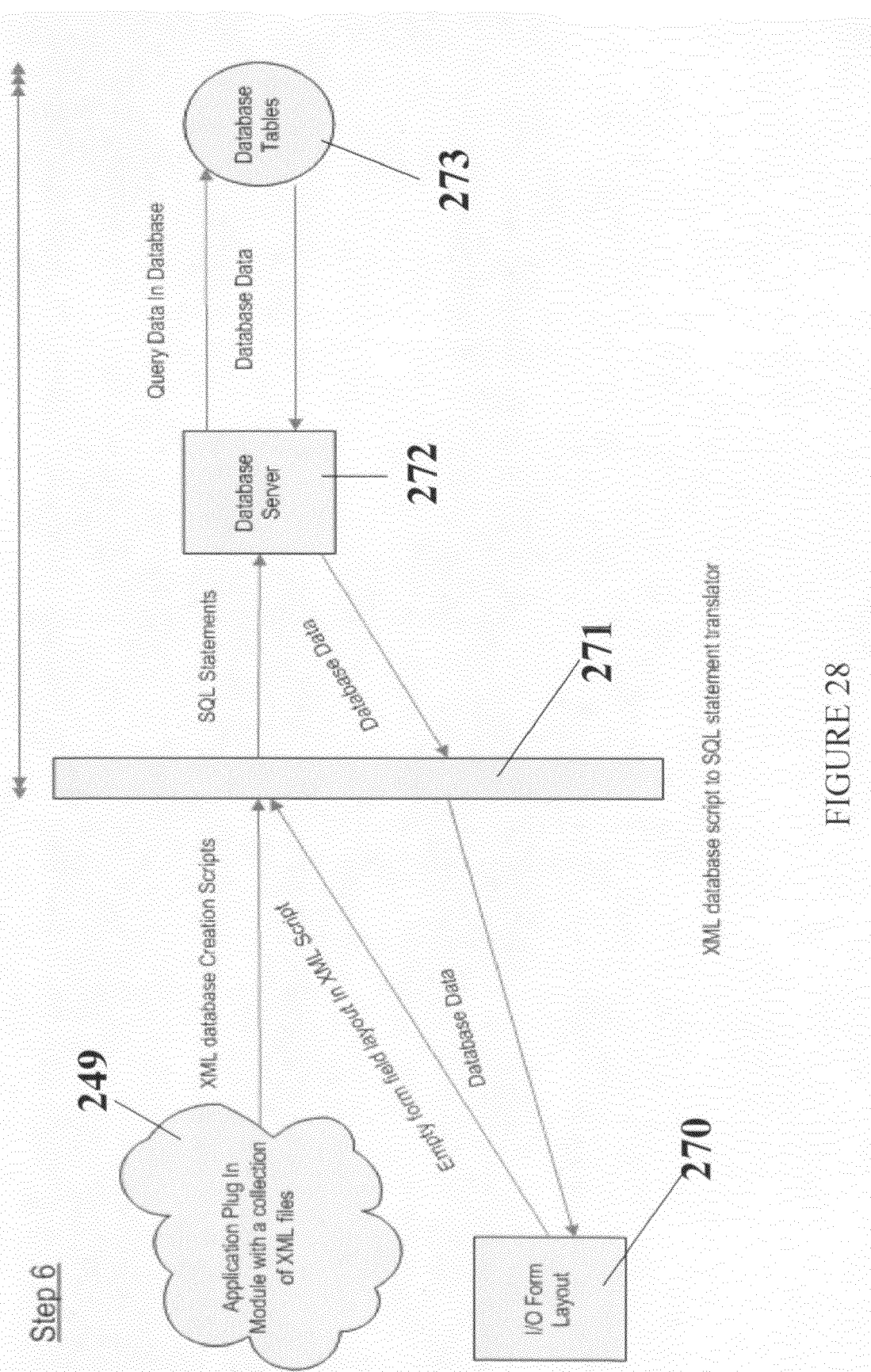
FIG. 28 illustrates the process by which data is queried from a database table.

FIG. 28 illustrates the process by which data is queried from a database table 273. The application specific plug-in module 249 delivers the XML database field scripts associated with the I/O data entry form fields. Together with the data entry form descriptive XML script, they are passed to an XML to SQL translation layer 271. After the SQL statements are created the statements are passed to database server 272 that then passes the data base query to the database table 280, which then locates the data to be returned as a result, passing it back to the database server 272. The database server then passes the information to the translation layer 271 to be passed to and displayed by the I/O layout form 270.

FIG. 29 illustrates an embodiment of the database design form 290. Selection of one of the column definitions 291 opens a graphical user interface used to design the field properties of the database column, as shown in FIG. 30. Database fields can be added by selecting the "Add" button 292, deleted with the "Delete" button 293, or modified with the "Modify" button 294.

FIG. 30 illustrates an embodiment of the graphical user interface 300 used to design the field properties of a database column (step 241 in FIG. 24) that includes the field name, data type, data width and display name. The field can be a variable character text field, an integer field, a double or a decimal field, and a date time field.

FIGS. 31a and 31b illustrate an embodiment of the graphical user interface 310 used to design a demographic data entry form layout with the Plug-In Tool layout tool (step 243 in FIG. 24). Different controls such as an edit box or a drop down box 311 can be placed on the form surface and selected by a user by right clicking an empty spot in the grid area of graphical user interface 310.

FIGS. 32a and 32b illustrate an embodiment of the graphical user interface 320 used to design a session data entry form layout with the Plug-In Tool layout tool (step 243 in FIG. 24). Different controls such as an edit box or a drop down box can be placed on the form surface.

Figure 33:
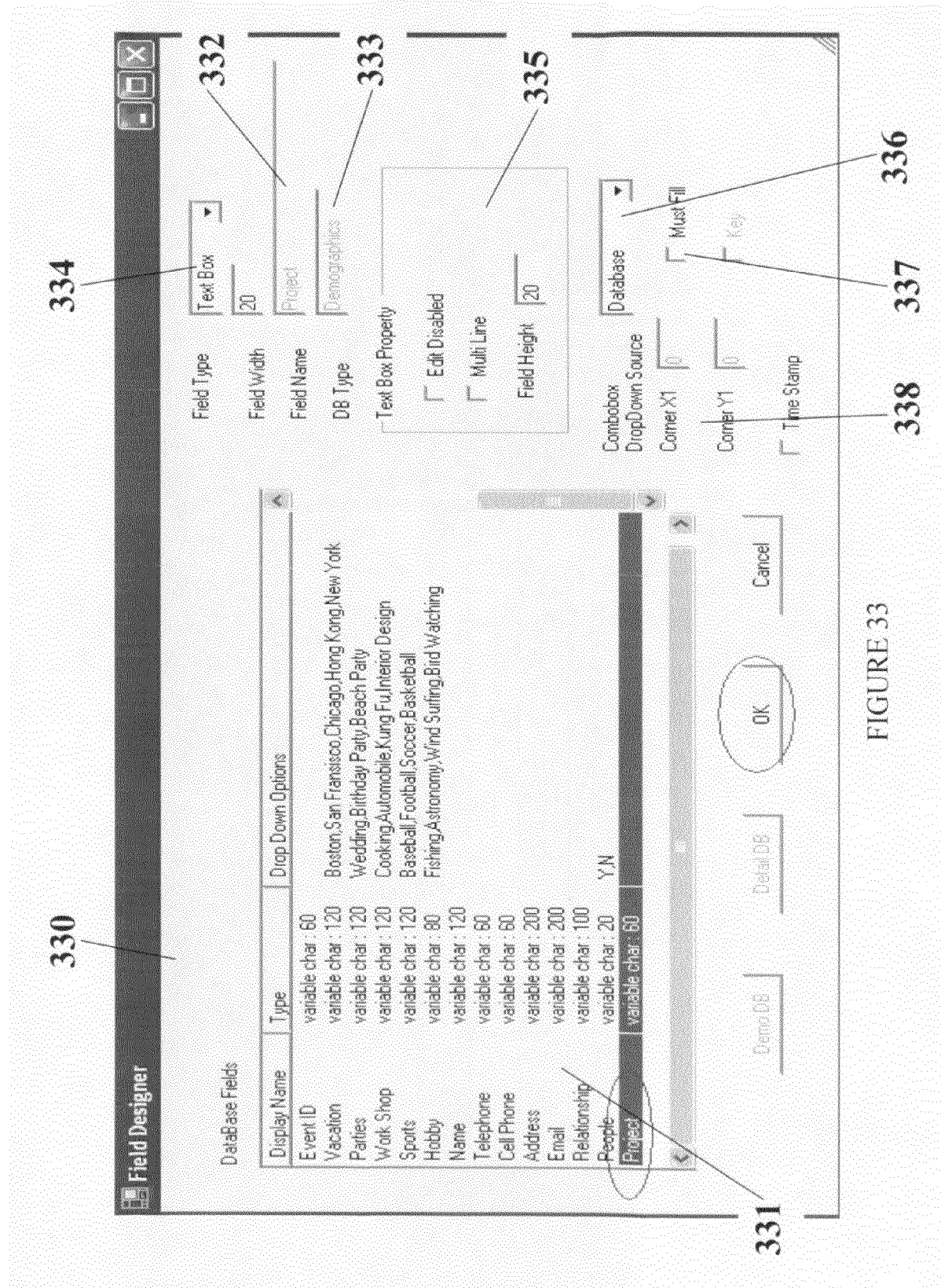
FIG. 33 illustrates that each I/O field in the form has a set properties programmable by a user.

FIG. 33 illustrates a Field Designer Screen 330 that displays all input/output fields 331 in the form that have set properties programmed by a user. This includes the associated database field, field type or control type, field width, and source of database (demographic or session). A user selects a field 331 from the screen 330 to define what the data entry presents. The selected field information will appear in the "Field Name" text box 332 and "DB Type" text box 333. The user then selects either a "Text Box" or a "Combo Box" in the "Field Type" drop down list 334. A "Text Box" is a pure text entry field. A "Combo Box" allows a selection from a list of previous entry as well as entering text. If the field type is a "Text box" the user may select the "Text box Property" 335. If the field type is a "Combo box", the user may select an option from the "Combobox DropDown Source" box 336. A "Database" option will show the previous entry from the database into the combobox list in the real application. A "Programmed option" will show the preprogrammed choices when the database field was designed. A check in the "Must Fill" check box 337 will require a data entry field to be filled in before the data entry form can be processed. Change in the values in the "Corner X1" and Corner "Y1" boxes 338 reallocate the field position in the data entry form.

FIG. 34 illustrates the XML script that describes an I/O field of a form.

FIG. 35 illustrates an embodiment of the graphical user interface used to design a report layout with the Plug-In Tool layout tool (step 245 in FIG. 24). Different text label, image area and text area can be placed on the report surface.

Figure 37:
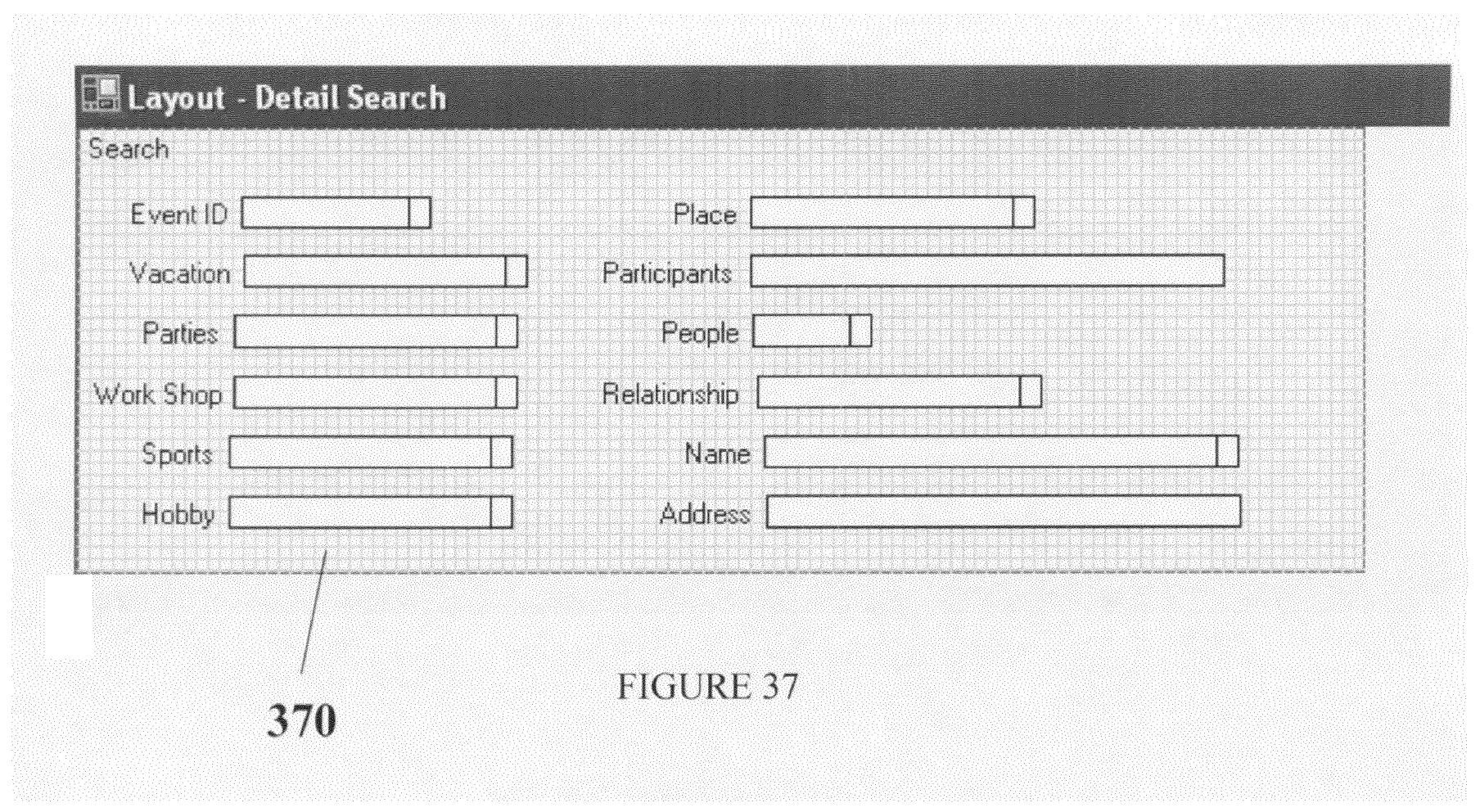

FIG. 36 illustrates an embodiment of the graphical user interface 360 used to design a simple query form layout with the Plug-In Tool layout tool (step 247 in FIG. 24). FIG. 37 illustrates an embodiment of the graphical user interface 370 used to design a detailed query form layout with the Plug-In Tool layout tool (step 247 in FIG. 24). Different controls such as an edit box or a drop down box can be placed on the form surface.

What is claimed is:

1. A method of implementing an extensible multimedia software system for an entity, wherein the system automatically generates a customized multimedia plug-in application without entity written programming code, the method comprising:

a) installing the system onto a computer with a processor and memory storage, over a computer network from a remote server;

b) designing at least one plug-in application demographic database with a graphical user interface database layout tool, wherein the graphical user interface database layout tool allows the selection of one or more data fields to the plug-in application demographic database, further wherein the graphical user interface database layout tool allows modification of the data types contained by selected data fields, wherein the plug-in application demographic database must contain at least one data field to identify the entity;

c) in response to step b) above, the system automatically generates demographic database specific XML files for storage on the computer;

d) designing at least one plug-in application session database with the graphical user interface database layout tool, wherein the graphical user interface database layout tool allows the selection of one or more data fields to the plug-in application session database, further wherein the graphical user interface database layout tool allows modification of the data types contained by selected data fields, wherein the plug-in application session database must contain at least a first data field to identify the entity and a second data field to identify a session date and time;

e) in response to step d) above, the system automatically generates session database specific XML files for storage on the computer;

f) designing a demographic entry form with a graphical user interface form layout tool, wherein the graphical user interface database layout tool allows the selection of one or more data entry fields to the demographic entry form, further wherein the demographic entry form comprises at least one data entry field for inputting data into the data fields of the plug-in application demographic database;

g) automatically generating demographic entry form specific XML files for storage on the on the computer;

h) designing a session entry form with the graphical user interface form layout tool, wherein the graphical user interface database layout tool allows the selection of one or more data entry fields to the session entry form, further wherein the session entry form comprises at least one data entry field for inputting data into the data fields of the plug-in application session database;

i) automatically generating session entry form specific XML files for storage on the computer;

j) designing a report entry form with the graphical user interface form layout tool, wherein the graphical user interface database layout tool allows the selection of one or more data entry fields to the report entry form, further wherein the report entry form comprises at least one data field for outputting data from the data fields of the plug-in application demographic and session databases;

k) automatically generating report entry form specific XML files for storage on the computer;

l) designing a data query form with the graphical user interface form layout tool, wherein the graphical user interface database layout tool allows the selection of one or more data entry fields to the data query form, further wherein the data query form comprises at least one data entry field for inputting data into the data fields of the plug-in application demographic and session databases;

m) automatically generating data query form specific XML files for storage on the computer;

n) translating the XML demographic and session database files, the XML demographic entry, session entry, report entry, and data query form layout files into structured query language (SQL) statements;

o) transmitting the SQL statements to the remote server over the computer network for demographic and session database storage and queries;

p) installing the plug-in application onto a designated end-user computer over the network;

q) transmitting the SQL statements to the designated end-user computer and translating the SQL statements to XML files;

r) converting the XML files into viewable forms on the designated end-user computer; and s) repeating steps g), i), n), and o) each time any new data is entered into the data entry fields of the demographic entry form and the session entry form.

2. The method of claim 1, further comprising: inputting a data search query into the data entry field of the data query form, automatically generating updated data query form XML files, translating the updated data query form XML files into updated data query form SQL statements, transmitting the updated data query form SQL statements to the remote server, performing the data search query on the demographic and session database, locating the data in the demographic and session databases, transmitting search result SQL statements to the designated end-user computer, translating the search result SQL statements into XML result form layout files, and converting the XML result form layout files into viewable result forms on the designated end-user computer.

3. The method of claim 1, wherein designing a session entry form with the graphical user interface form layout tool, wherein the session entry form comprises at least one data entry field for inputting data into the data fields of the plug-in application session database.

4. The method of claim 1, wherein the entity may be selected from the group consisting of an individual, a business entity, an event, and a sales account.

5. The method of claim 1, wherein the remote server may be a plurality of computers, each attached to the computer network, wherein each computer has a processor and storage memory.

6. The method of claim 1, wherein the remote server may comprise an additional static database that stores entity user account information and passwords.

7. The method of claim 1, wherein the graphical user interface form layout tool allows the selection data entry fields to include labels, text boxes, combo boxes, groups, video, images, and lines.

8. The method of claim 1, wherein a new plug-in application session database is designed for each event of an entity.

9. The method of claim 1, wherein the data entry fields of the demographic entry form allow input and storage of video and image files captured by a camera connected to the end-user computer.

10. The method of claim 1, wherein the data entry fields of the session entry form allow input and storage of video and image files captured by a camera connected to the end-user computer.

11. The method of claim 1, wherein the data fields of the plug-in application demographic database receive and store video and image files transmitted from the end-user computer.

12. The method of claim 1, wherein the data fields of the plug-in application session database receive and store video and image files transmitted from the end-user computer.

13. The method of claim 1, wherein the data entry fields of the report entry form output video and image files stored in the demographic and session databases of the remote server.

14. The method of claim 1, wherein the data entry fields of the demographic entry form allow input and storage of data with voice commands.

15. The method of claim 1, wherein the data entry fields of the session entry form allow input and storage of data with voice commands.

* * * * *